US008527977B1

(12) United States Patent
Cheng et al.

(10) Patent No.: US 8,527,977 B1
(45) Date of Patent: *Sep. 3, 2013

(54) SOFTWARE UNINSTALLATION SYSTEM, METHOD AND COMPUTER PROGRAM PRODUCT

(75) Inventors: William Cheng, San Gabriel, CA (US); Kenneth Hwang, Los Angeles, CA (US); Ravi Kannan, Los Angeles, CA (US); Babu Katchapalayam, Los Angeles, CA (US); Bing Liu, Alhambra, CA (US); Balaji Narasimhan, Culver City, CA (US); Gopal Ramanujam, Los Angeles, CA (US); Jonathan Tran, Alhambra, CA (US)

(73) Assignee: McAfee, Inc., Santa Clara, CA (US)

( * ) Notice: Subject to any disclaimer, the term of this patent is extended or adjusted under 35 U.S.C. 154(b) by 1156 days.

This patent is subject to a terminal disclaimer.

(21) Appl. No.: 11/855,985

(22) Filed: Sep. 14, 2007

Related U.S. Application Data

(63) Continuation of application No. 11/378,857, filed on Mar. 16, 2006, now Pat. No. 8,407,683, which is a continuation of application No. 11/198,726, filed on Aug. 4, 2005, which is a continuation of application No. 10/456,208, filed on Jun. 5, 2003, now Pat. No. 7,107,366, which is a continuation of application No. 10/264,670, filed on Oct. 4, 2002, now Pat. No. 6,668,289, which is a continuation of application No. 10/136,266, filed on Apr. 30, 2002, now Pat. No. 6,496,875, which is a continuation of application No. 09/661,117, filed on Sep. 13, 2000, now Pat. No. 6,457,076, which is a continuation of application No. 08/660,488, filed on Jun. 7, 1996, now Pat. No. 6,151,643.

(51) Int. Cl.
*G06F 9/44* (2006.01)
*G06F 9/445* (2006.01)

(52) U.S. Cl.
USPC ........... 717/168; 717/171; 717/172; 717/173; 717/174; 717/176; 717/177; 717/178

(58) Field of Classification Search
None
See application file for complete search history.

(56) References Cited

U.S. PATENT DOCUMENTS 3,969,723 A 7/1976 Kennicott
4,293,908 A 10/1981 Bradley (Continued)

FOREIGN PATENT DOCUMENTS

EP 0398647 5/1990
EP 0562890 A1 9/1993

(Continued)

OTHER PUBLICATIONS

Dagenais et al., "Lude: A Distributed Software Library," LISA, Nov. 1993.*

(Continued)

*Primary Examiner* — Insun Kang
(74) *Attorney, Agent, or Firm* — Wong, Cabello, Lutsch, Rutherford & Brucculeri, LLP

(57) ABSTRACT

A system, method and computer program product are provided for uninstalling software on a computer. In use, a plurality of software products identified on a computer is displayed. Further, a first user instruction to uninstall at least a portion of at least one of the software products from the computer is received. Such first user instruction is received via an interface. Still yet, the at least a portion of the at least one software product is uninstalled from the computer, in response to the receipt of the first user instruction. Also, a second user instruction may be received to cancel the uninstallation. Thus, the uninstallation may be cancelled, in response to the receipt of the second user instruction.

22 Claims, 25 Drawing Sheets

(56) References Cited

U.S. PATENT DOCUMENTS

| | | |
|---|---|---|
| 4,300,193 A | 11/1981 | Bradley |
| 4,300,194 A | 11/1981 | Bradley |
| 4,317,169 A | 2/1982 | Panepinto, Jr. |
| 4,321,665 A | 3/1982 | Shen |
| 4,340,933 A | 7/1982 | Miu |
| 4,383,295 A | 5/1983 | Miller |
| 4,387,423 A | 6/1983 | King |
| 4,484,271 A | 11/1984 | Miu |
| 4,495,571 A | 1/1985 | Staplin, Jr. |
| 4,558,413 A | 12/1985 | Schmidt |
| 4,584,641 A | 4/1986 | Guglielmino |
| 4,646,229 A | 2/1987 | Boyle |
| 4,674,055 A | 6/1987 | Ogaki |
| 4,714,992 A | 12/1987 | Gladney |
| 4,796,181 A | 1/1989 | Wiedemer |
| 4,831,516 A | 5/1989 | Tanaka |
| 4,841,441 A | 6/1989 | Nixon |
| 4,897,781 A | 1/1990 | Chang et al. |
| 4,970,672 A | 11/1990 | Snodgrass |
| 4,974,149 A | 11/1990 | Valenti |
| 5,008,814 A | 4/1991 | Mathur |
| 5,121,345 A | 6/1992 | Lentz |
| 5,155,847 A | 10/1992 | Kirouac |
| 5,228,123 A | 7/1993 | Heckel |
| 5,263,164 A | 11/1993 | Kannady |
| 5,287,507 A | 2/1994 | Hamilton et al. |
| 5,321,750 A | 6/1994 | Nadan |
| 5,327,435 A | 7/1994 | Warchol |
| 5,347,632 A | 9/1994 | Filepp et al. |
| 5,355,352 A | 10/1994 | Kobayashi |
| 5,359,730 A | 10/1994 | Marron |
| 5,386,369 A | 1/1995 | Christiano |
| 5,388,255 A | 2/1995 | Pytlik et al. |
| 5,390,256 A | 2/1995 | Mandell et al. |
| 5,428,741 A | 6/1995 | Ho |
| 5,430,465 A | 7/1995 | Sabella |
| 5,434,999 A | 7/1995 | Goire |
| 5,450,334 A | 9/1995 | Pulizzi |
| 5,450,589 A | 9/1995 | Maebayashi |
| 5,452,447 A | 9/1995 | Nelson et al. |
| 5,455,926 A | 10/1995 | Keele |
| 5,457,795 A | 10/1995 | Willman |
| 5,459,506 A | 10/1995 | Bushnell |
| 5,471,438 A | 11/1995 | Kobayashi |
| 5,473,772 A | 12/1995 | Halliwell |
| 5,483,586 A | 1/1996 | Sussman |
| 5,495,610 A | 2/1996 | Shing |
| 5,499,357 A | 3/1996 | Sonty |
| 5,519,832 A | 5/1996 | Warchol |
| 5,528,490 A | 6/1996 | Hill |
| 5,530,899 A | 6/1996 | MacDonald |
| 5,535,395 A | 7/1996 | Tipley |
| 5,553,248 A | 9/1996 | Melo |
| 5,553,310 A | 9/1996 | Taylor |
| 5,555,416 A | 9/1996 | Owens et al. |
| 5,564,051 A | 10/1996 | Halliwell |
| 5,577,244 A | 11/1996 | Killebrew |
| 5,579,521 A | 11/1996 | Shearer |
| 5,579,537 A | 11/1996 | Takahisa |
| 5,581,764 A | 12/1996 | Fitzgerald |
| 5,600,834 A | 2/1997 | Howard |
| 5,602,993 A | 2/1997 | Stromberg |
| 5,603,034 A | 2/1997 | Swanson |
| 5,604,542 A | 2/1997 | Dedrick |
| 5,608,805 A | 3/1997 | Mandell et al. |
| 5,623,600 A | 4/1997 | Ji et al. |
| 5,625,818 A | 4/1997 | Zarmer |
| 5,629,980 A | 5/1997 | Stefik |
| 5,630,116 A | 5/1997 | Takaya |
| 5,634,102 A | 5/1997 | Capps |
| 5,640,572 A | 6/1997 | Mondrik |
| 5,642,417 A | 6/1997 | Stringer |
| 5,646,992 A | 7/1997 | Stubler |
| 5,666,411 A | 9/1997 | McCarty |
| 5,675,724 A | 10/1997 | Beal |
| 5,678,002 A | 10/1997 | Fawcett |
| 5,682,533 A | 10/1997 | Siljestroemer |
| 5,694,546 A * | 12/1997 | Reisman ..................... 705/27.1 |
| 5,694,596 A | 12/1997 | Campbell |
| 5,704,060 A | 12/1997 | Del Monte |
| 5,715,403 A | 2/1998 | Stefik |
| 5,721,919 A | 2/1998 | Morel et al. |
| 5,732,266 A | 3/1998 | Moore et al. |
| 5,737,218 A | 4/1998 | Demotte et al. |
| 5,740,365 A | 4/1998 | Pfeiffer |
| 5,740,427 A | 4/1998 | Stoller |
| 5,742,829 A | 4/1998 | Davis et al. |
| 5,758,154 A | 5/1998 | Qureshi |
| 5,761,380 A | 6/1998 | Lewis |
| 5,761,499 A | 6/1998 | Sonderegger |
| 5,764,913 A | 6/1998 | Jancke et al. |
| 5,768,566 A * | 6/1998 | Harikrishnan et al. ........ 717/170 |
| 5,784,563 A | 7/1998 | Marshall et al. |
| 5,790,793 A | 8/1998 | Higley |
| 5,793,966 A | 8/1998 | Amstein et al. |
| 5,794,259 A | 8/1998 | Kikinis et al. |
| 5,796,952 A | 8/1998 | Davis et al. |
| 5,799,157 A | 8/1998 | Escallon |
| 5,809,230 A | 9/1998 | Pereira |
| 5,822,539 A | 10/1998 | van Hoff |
| 5,826,011 A | 10/1998 | Chou |
| 5,835,087 A | 11/1998 | Herz et al. ..................... 715/810 |
| 5,835,697 A | 11/1998 | Watabe |
| 5,835,911 A | 11/1998 | Nakagawa et al. |
| 5,841,978 A | 11/1998 | Rhoads |
| 5,842,216 A * | 11/1998 | Anderson et al. ..................... 1/1 |
| 5,845,077 A | 12/1998 | Fawcett |
| 5,860,012 A | 1/1999 | Luu |
| 5,870,611 A | 2/1999 | Shrader |
| 5,875,247 A * | 2/1999 | Nakashima et al. ............ 705/52 |
| 5,879,162 A | 3/1999 | Bergman |
| 5,880,388 A | 3/1999 | Kajiyama |
| 5,881,236 A | 3/1999 | Dickey |
| 5,896,566 A | 4/1999 | Averbuch |
| 5,909,696 A | 6/1999 | Reinhardt |
| 5,911,071 A | 6/1999 | Jordan |
| 5,918,008 A | 6/1999 | Togawa et al. |
| 5,919,247 A | 7/1999 | Van Hoff et al. |
| 5,928,323 A | 7/1999 | Gosling et al. |
| 5,930,513 A | 7/1999 | Taylor |
| 5,930,514 A | 7/1999 | Thompson |
| 5,933,646 A | 8/1999 | Hendrickson et al. ........ 717/169 |
| 5,946,664 A | 8/1999 | Ebisawa |
| 5,948,104 A | 9/1999 | Gluck et al. |
| 5,950,008 A | 9/1999 | van Hoff |
| 5,953,012 A | 9/1999 | Veghte et al. |
| 5,956,481 A | 9/1999 | Walsh et al. |
| 5,958,051 A | 9/1999 | Renaud et al. |
| 5,959,989 A | 9/1999 | Gleeson |
| 5,960,170 A | 9/1999 | Chen et al. |
| 5,966,540 A | 10/1999 | Lister |
| 5,990,907 A | 11/1999 | Colletti |
| 5,991,760 A | 11/1999 | Gauvin et al. |
| 5,991,856 A | 11/1999 | Spilo |
| 6,006,035 A | 12/1999 | Nabahi |
| 6,009,274 A | 12/1999 | Fletcher et al. |
| 6,012,081 A | 1/2000 | Dorn |
| 6,020,885 A | 2/2000 | Honda |
| 6,023,724 A | 2/2000 | Bhatia et al. |
| 6,035,423 A | 3/2000 | Hodges et al. |
| 6,041,360 A | 3/2000 | Himmel et al. |
| 6,048,026 A | 4/2000 | Barnett |
| 6,049,663 A * | 4/2000 | Harikrishnan et al. ......... 703/23 |
| 6,049,671 A | 4/2000 | Slivka et al. |
| 6,065,120 A | 5/2000 | Laursen et al. |
| 6,065,679 A | 5/2000 | Levie |
| 6,072,871 A | 6/2000 | Ur |
| 6,073,172 A | 6/2000 | Frailong et al. |
| 6,092,194 A | 7/2000 | Touboul |
| 6,092,204 A | 7/2000 | Baker |
| 6,138,237 A | 10/2000 | Ruben et al. |
| 6,145,088 A | 11/2000 | Stevens |
| 6,151,609 A | 11/2000 | Truong |
| 6,151,643 A | 11/2000 | Cheng et al. |

| | | | |
|---|---|---|---|
| 6,154,844 | A | 11/2000 | Touboul et al. |
| 6,161,130 | A | 12/2000 | Horvitz et al. |
| 6,161,218 | A | 12/2000 | Taylor |
| 6,167,567 | A | 12/2000 | Chiles et al. |
| 6,169,992 | B1 | 1/2001 | Beall et al. |
| 6,173,337 | B1 | 1/2001 | Akhond |
| 6,173,406 | B1 | 1/2001 | Wang et al. |
| 6,185,625 | B1 | 2/2001 | Tso et al. |
| 6,202,158 | B1 | 3/2001 | Urano et al. |
| 6,208,995 | B1 | 3/2001 | Himmel et al. |
| 6,219,790 | B1 | 4/2001 | Lloyd et al. |
| 6,240,530 | B1 | 5/2001 | Togawa |
| 6,256,668 | B1 | 7/2001 | Slivka et al. |
| 6,266,774 | B1 | 7/2001 | Sampath et al. |
| 6,269,456 | B1 | 7/2001 | Hodges et al. |
| 6,272,631 | B1 | 8/2001 | Thomlinson et al. |
| 6,286,001 | B1 | 9/2001 | Walker et al. |
| 6,321,334 | B1 | 11/2001 | Jerger et al. |
| 6,327,617 | B1 | 12/2001 | Fawcett |
| 6,345,361 | B1 | 2/2002 | Jerger et al. |
| 6,360,255 | B1 | 3/2002 | McCormack et al. |
| 6,430,738 | B1 | 8/2002 | Gross et al. |
| 6,434,607 | B1 | 8/2002 | Haverstock et al. |
| 6,457,076 | B1 | 9/2002 | Cheng et al. |
| 6,496,875 | B2 | 12/2002 | Ramanujam |
| 6,499,109 | B1 | 12/2002 | Balasubramaniam et al. |
| 6,598,060 | B2 | 7/2003 | Goldick |
| 6,668,289 | B2 | 12/2003 | Cheng et al. |
| 6,675,162 | B1 | 1/2004 | Russell-Falla et al. |
| 6,701,441 | B1 | 3/2004 | Balasubramaniam et al. |
| 7,107,366 | B2 | 9/2006 | Cheng et al. |
| 7,653,687 | B2 | 1/2010 | Reisman |
| 2002/0078345 | A1 | 6/2002 | Sandhu et al. |
| 2002/0087660 | A1 | 7/2002 | Martin et al. |
| 2002/0124170 | A1 | 9/2002 | Johnson, Jr. |
| 2003/0037041 | A1* | 2/2003 | Hertz ............... 707/1 |
| 2005/0044544 | A1* | 2/2005 | Slivka et al. ........ 717/174 |
| 2011/0185351 | A1 | 7/2011 | Fawcett |

FOREIGN PATENT DOCUMENTS

| | | |
|---|---|---|
| EP | 0770965 A1 | 5/1997 |
| EP | 0845894 A3 | 9/1999 |
| GB | 2291228 A | 1/1996 |
| JP | 430218 | 2/1992 |
| JP | H7-129407 | 5/1995 |
| JP | H7-334352 | 12/1995 |
| JP | H8-95880 | 4/1996 |
| JP | 200029883 A | 1/2000 |
| WO | WO9534857 | 12/1995 |
| WO | WO9804976 | 2/1998 |

OTHER PUBLICATIONS

Person, "Special Edition Using Windows 95", 1995, Que Corporation, pp. 303-324, 1021, 1022, 1027,1053,1054.*
Final Office Action Summary from U.S. Appl. No. 11/378,857 mailed on Jan. 25, 2010.
Final Office Action Summary from U.S. Appl. No. 11/198,726 mailed on Mar. 17, 2010.
Office Action Summary from U.S. Appl. No. 11/198,726 mailed on Jun. 12, 2009.
Office Action Summary from U.S. Appl. No. 11/378,857 mailed on May 14, 2009.
Ron Person, "Special Edition Using Windows 95", 1995, Que Corporation, pp. 321 and 322.
Snyder, David C. "Poor Man's Mirror Script" Newsgroups: comp.os.linux.announce, 1995.
Milburn, John "HP-UX Patch Availability" Newsgroups: comp.sys.hp, 1993.
Keller Arthur M., "Smart Catalogs and Virtual Catalogs".
"Remote Subscription Services" IBM Technical Disclosure Bulletin, vol. 37 No. 06B, Jun. 1994.
Bolte, "FTPGET Script" Jun. 30, 1993, Cray computer Corporation.
Anderson, Paul, "Towards a High-Level Machine Configuration System", 1994 LISA—Sep. 19-23, 1994—San Diego, CA.
Anderson, Paul, "Managing Program Binaries in a Heterogeneous UNIX Network", Lisa V—Sep. 30-Oct. 3, 1991—San Diego, CA.
Cheng, et al., "Design and Implementation of a Distributed File System" Software—Practice and Experience, vol. 21(7), p. 657-675, Jul. 1991.
Daniels, Dean S., et al., "An Algorithm for Replicated Directories" Symposium on Principles of Distributed Computing 1983 http://wotan.liu.edu/docis/dbl/podcpo/1983__104__AAFRD.htm.
Eirich, Thomas "Beam: A Tool for Flexible Software Update" 1994 LISA—Sep. 19-23, 1994—San Diego, CA, Usenix Association Proceedings of the Eighth System Administration Conference (Lisa VIII).
Fuchs, W. Kent, et al. "Low-Cost Comparison and Diagnosis of Large Remotely Located Files" 1986 IEEE.
Gopal et al., "Directories for Networks with Casually Connected Users" 1998 IEEE.
Grosse, Eric, "Repository Mirroring" At&T Bell Laoratories, Murray Hill NJ 07974 USA.
Harlander, Dr. Magnus, "Central System Administration in a Heterogeneous Unix Environment: GeNUAdmin", http://www.genua.de/forum/artikel/lisa94/index__html.
Hideyo, I., "OMNICONF—Making OS Upgrades and Disk Crash Recovery Easier" http://www.usenix.org/publications/library/proceedings/lisa94/full__papers/hideyo.a. .
Howard, John H., "Using Reconciliation to Share Files Between Occasionally Connected Computers" Mitsubishi Electric Research Laboratories, Inc. 1994.
Jia, et al., "Highly Concurrent Directory Management in the Galaxy Distributed Systems", 1990 IEEE.
Osel, et al., "OpenDist-Incremental Software Distribution" Ninth System Administration Conference LISA IX, Sep. 17-22, 1995.
Rich, et al. "Hobgoblin: A File and Directory Auditor" LISA V—Sep. 30-Oct. 3 1991—San Diego, California.
Rouillard, J.P. and Martin, R.B., "Config: A Mechanism for Installing and Tracking System Configurations" 1994 Large Installation Systems Administration, p. 9-17, Sep. 1994, San Diego, California.
Sarin, et al., "A Flexible Algorithm for Replicated Directory Management" 1989 IEEE.
Satdeva, et al., "Fdist: A Domain Based File Distribution System for a Heterogeneous Environment" LISA V—Sep. 30-Oct. 3, 1991—San Diego, CA p. 109-125.
Sellens, John "Software Maintenance in a Campus Environment: The Xhier Approach", LISA V—Sep. 30-Oct. 3, 1991—San Diego, CA, p. 21-28.
Wong, Walter, "Local Disk Depot-Customizing the Software Environment", 1993 LISA—Nov. 1-5, 1993 Monterey, California.
Office Action from European Application 97109222.6-1238 mailed Mar. 4, 2002.
Office Action from European Application 97109222.6-1238 mailed Jun. 4, 2001.
Search Report from European Application 97109222.6-2201 mailed Dec. 28, 1998.
Smith, Rodriguez, et al., "Removal of Software Configuration Changes" Delphion Mar. 1996.
Reid, John P., "The Problem of Disk Space" Antiques Computer Column: Jul. 1995.
Foreign Office Action from related Japan application No. H9-151, 367 which was dispatched on May 16, 2006.
"To Download Necessary Files" Nikkei Business Publications, Inc., Dec. 1, 1994, No. 1333, pp. 269-280.
"How to use LHA that is too late to ask" Kogakusha Co., Ltd. Jun. 1, 1996 vol. 21, No. 6 pp. 100-101.
"Prototype Implementation of Super-Distributed System" Technical Report of IEICE, IEICE May 24, 1996 vol. 96, No. 71 pp. 1-5.
"Expansion of Windows 3.1-based uninstall software; Standard function for Win 95" Nikkei Open Systems, Sep. 15, 1995, No. 30, p. 253-255.
"G-Search's Approach to Internet Services" Fujitsu Limited, May 10, 1996, vol. 47, No. 3 pp. 255-260.
Kunugawa, Iwao, "Ask Me All About Internet: Part I" ASCII Corp. vol. 18, No. 9, pp. 245-268 Sep. 1, 1994.
"Raising User's Awareness with Prototype: Collect Information on Internet and PC Communications" Nikkei Open Systems, Nikkei Business Publications, Inc. No. 37, pp. 331-342.

"Windows 95 for Business, Part II—Verifying the Capability as Client OS" Nikkei Open Systems, Nikkei Business Publications, Inc. No. 33, pp. 286-287, Dec. 15, 1995.
Final Office Action from U.S. Appl. No. 11/378,857 dated Jan. 25, 2010.
Office Action Summary from U.S. Appl. No. 10/265,030 mailed on Mar. 7, 2003.
Office Action Summary from U.S. Appl. No. 10/265,030 mailed on Feb. 19, 2004.
Office Action Summary from U.S. Appl. No. 10/265,030 mailed on Aug. 18, 2003.
Decision on Appeal Brief from U.S. Appl. No. 10/265,030 mailed on Apr. 28, 2005.
Office Action Summary from U.S. Appl. No. 10/265,030 mailed on Jun. 25, 2003.
Office Action Summary from U.S. Appl. No. 10/180,579 mailed on Mar. 18, 2003.
Office Action Summary from U.S. Appl. No. 10/180,579 mailed on Jun. 17, 2003.
Office Communication from U.S. Appl. No. 10/180,579 mailed on Jan. 12, 2004.
Advisory Action from U.S. Appl. No. 10/180,579 mailed on Jul. 14, 2003.
Office Action Summary from U.S. Appl. No. 09/248,115 mailed on Jun. 20, 2002.
Office Action Summary from U.S. Appl. No. 09/248,115 mailed on Mar. 20, 2002.
Office Action Summary from U.S. Appl. No. 10/677,786 mailed on Sep. 13, 2004.
Office Action Summary from U.S. Appl. No. 10/264,923 mailed on Jul. 29, 2003.
Office Action Summary from U.S. Appl. No. 09/248,115 mailed on Aug. 20, 2002.
Office Action Summary from U.S. Appl. No. 09/661,117 mailed on Sep. 11, 2001.
Office Action Summary from U.S. Appl. No. 09/661,117 mailed on Jan. 23, 2002.
Office Action Summary from U.S. Appl. No. 09/661,117 mailed on Mar. 21, 2001.
Office Action Summary from U.S. Appl. No. 10/136,266 mailed on Aug. 8, 2002.
Office Action Summary from U.S. Appl. No. 10/125,276 mailed on Jun. 18, 2003.
Office Action Summary from U.S. Appl. No. 10/456,208 mailed on Feb. 7, 2005.
Office Action Summary from U.S. Appl. No. 10/264,670 mailed on Mar. 21, 2003.
Office Action Summary from U.S. Appl. No. 08/660,488 mailed on Jan. 20, 1998.
Office Action Summary from U.S. Appl. No. 08/660,488 mailed on Aug. 24, 1998.
Office Action Summary from U.S. Appl. No. 08/660,488 mailed on Mar. 9, 1999.
Office Action Summary from U.S. Appl. No. 08/660,488 mailed on Oct. 7, 1999.
Cooper, Michael A., "Overhauling Rdist for the 90s" 1992 LISA VI—Oct. 19-23, 1992—Long Beach, CA, p. 175-88.
Berg, Cliff, "How do I Create a Signed Applet?" JAVA Q&A, Dr. Dobb's Journal, Aug. 1997, p. 109-122.
Kearns, Dave, "Use Year 2000 to your advantage" Network world, Mar. 2, 1998 v15 n9 p. 18 (1).
Dodge et al., "Web cataloguing through cache exploitation and steps toward consistency maintenance" Computer Networks and ISDN Systems 27 (1995) 1003-1008.
Glassman, Steven, "A caching relay for the World Wide Web" Computer Networks and ISDN Systems 27 (1994) 165-173.
Flower, Eric, "Step-Up to MS-DOS 6.2: An Early Look at Microsoft's Latest Upgrade" Computers in Libraries, Feb. 1994 vol. 14 No. 2.
Husain, Kamran, "Extending Imake: Taking a tool beyond the X Window System", Dr. Dobbs Journal, Jun. 1994.
"Microsoft Word Macro Virus Protection Tool Readme" May 10, 1996, Copyright 1995 Microsoft Corporation.

Karnes, Clifton "How to install Windows programs" Compute! Issue 161/Feb. 1994/p. 6.
Goldfayn, Alex L. "Software installs profit for area firm" Business and Technology, Copyright 2002 Chicago Tribune.
Nachbar, Daniel "When Network File Systems Aren't Enough: Automatic Software Distribution Revisited" USENIX Association Summer Conference Proceedings Jun. 9-13, 1986.
Felton, Edward W. "Webware Security" Communications of the ACM, Apr. 1997 v40 n4 p. 130 (1).
Kagan, Jeffrey "Never have time for Upgrades? Try an oil change on your software" Communications Week, Dec. 9, 1996 n 641 p. 48 (1).
"McAfee Extends SafetyNet to Displaced Cheyenne Customers; Introduces Upgrade Program Allowing Cheyenne ARCserve and InocuLAN Customers to Migrate to McAfee; Migration Utility and 40% Discount Simplify Upgrade to McAfee." Business Wire, Oct. 14, 1996 p. 10141136.
Grossman, Evan "eSafe effectively wards off malicious Net content" InfoWorld, Oct. 27, 1997 v 19 n43 p. 76D(2).
Livingston, Brian "Microsoft's Marvelous on-line service and other breaking news" InfoWorld, May 23, 1994 v16 n21 p. 32(1).
Greer, Earl, "Cheyenne gives networks InocuLAN booster shot," InforWorld, Dec. 16, 1996 v18 n51 p. N3(2).
Ferrill, Paul, "Frye Utilities for Networks" InfoWorld, Sep. 19, 1994 v16 n38 p. 112 (4).
Fischer, Carl, "In Scale: SMS weighs in.," InfoWorld Jan. 13, 1997 v19 n2 p. 70 (6).
Gryphon, Robert "Monitrix's tricks keep tab on your LAN; flexible reporting features deserve praise, but Cheyenne's technical support needs help" InfoWorld , Sep. 26, 1994 v16 n39 p. 97(2).
Nicolaisen, Nancy, "Development tools" (Stirling Technologies InstallSHIELD 3) Computer Shopper, Feb. 1996 v 16 n 2 p. 600(3).
Snyder, Joel, "Pick the best browser" Macworld, Oct. 1995 v12 n10 p. 111(5).
Tinkel, Kathleen, "Pain of updating runs deep for designers, managers" Mac Week, Nov. 17, 1997 v11 n44 p. 12(1).
Pearlstein, Joanna "FileWave 2.5 adds scripts, templates." MacWEEK Mar. 4, 1996 v10 n9 p. 12(2).
Snell, Monica "A cure for dangerous downloads" LAN Times, Dec. 18, 1996 v13 n28 p. 16(1).
Snell, Monica "Browser-administration kits get overhaul" LAN Times, Jun. 23, 1997 v 14 n13 p. 11(1).
DiDio, Laura, "InocuLAN 2.0 detects 1,750 viruses; Cheyenne debuts latest release of LAN-based virus software." LAN Times, Mar. 8, 1993 v10 n5 p. 7(1).
Petrovsky, Michele "Taking stock of your LAN: optimize your network with Brightwork's LAN Automatic Inventory and LAN Server Watch" LAN Computing, Aug. 1992 v3 n8 p. 33 (2).
Haskel, Darin, "Frye Computer's SUDS 'cleans up' File updates" LAN Times, May 10, 1993 v10 n9 p. 27(1).
Kane, Bob "Automating Win 95 installs" Windows Sources, Dec. 1996 v4 n12 p. 235(2).
Young, Robbin, "Browser" (Microsoft Internet Explorer 4.0 and Netscape's Navigator 4.0) Windows Sources, Nov. 1997 v4 n11 p. 179(3).
Andrews, Bradley "EZ-Install v.2.12.," Computer Language Mar. 1991 v8 n3 p. 80(2).
Hayes, Frank, "McAfees boasts 'net virus protection'" Computerworld, Jul. 14, 1997 v31 n28 p. 12(1).
Gaudin et al., "ActiveX gets security boost" Computerworld, Jun. 16, 1997 v31 n24 p. 12(1).
Powell, James E., "Good first impression with install programs" Data based Advisor, Jan. 1992 v10 n1 p. 20(2).
Frentzen et al., "Untangling Web-server choices is key consideration for Internet publishing" PC Week, Mar. 27, 1995 v12 n12 p. 89(2).
Gann, Roger "Unlnstaller for Windows 1.0" PC User, Jun. 16, 1993 n213 p. 80(1).
Hill, Robert, "Provide a professional setup routine" Data Based Advisor, Apr. 1996 v14 n4 p. 34(2).
Surkan, Michael "Safesuite spots net holds" PC Week Netweek Dec. 16, 1996.
Steffen, Joseph L., "Adding Run-time Checking to the Portable C Compiler" Software-Practice and Experience, vol. 22(4), 305-316 Apr. 1992.

Hastings, et al., "Purify: Fast Detection of Memory Leaks and Access Errors" USENIX—Winter 1992 p. 125-136.
Sanddock et al., "How to Upgrade 1500 Workstations on Saturday, and Still Have Time to Mow the Yard on Sunday" 19954 LISA IX—Sep. 17-22, 1995 Monterey CA, p. 59-65.
Dagenais et al., "Lude: A Distributed Software Library" 1993 LISA—Nov. 1-5, 1993—Monterey, CA, p. 25-32.
Futakata, Atsushi "Patch Control Mechanism for Large Scale Software" 1995 LISA IX—Sep. 17-22, 1995—Monterey CA, p. 213-219.
Cowan et al., "StackGuard: Automatic Adaptive Detection and Prevention of Buffer-Overflow Attacks" USENIX Association Seventh USENIX Security Symposium—Jan. 26-29, 1998.
"pc/arcers: MS-DOS archiving (compression) programs" University of Vaasa, http://garbouwasa_fi/pc/arcer.
Riddle, Paul "Automated Upgrades in a Lab Environment" 1994 LISA—Sep. 19-23, 1994—San Diego, CA, p. 33-36.
Austin et al., "Efficient Detection of All Pointer and Array Access Errors" Sigplan 94 Conference Jun. 20-24, 1994 Orlando FL., p. 290-301.
Gwertzman et al., "The Case for Geographical Push-Caching" 1995 IEEE, p. 51-55.
"Signing with Microsoft Authenticode™ Technology" Microsoft Corporation 1996.
Cobb, Michael, "What to look for in an enterprise anti-virus product" Database Web Advisor, v16 n3 p. S28(4), Mar. 1998.
"The Best One Stop Online PC Service on the Planet" Security-Online Copyright 1996, 1997.
"Special Edition Using Netscape 2, Second Edition" Que Corporation, p. 864/873.
"The Jolt & Productivity awards" Software development CMP DevNet Spotlight, http://www.sdmagazine.com/jolts/prey_utl.htm.
"Microsoft Windows NT Resource Kit" Microsoft Press, 1995, Microsoft Corporation.
"Compromised-Buffer-Overflows, from Intel to SPARC Version 8" CT 1993.
"http://cd.textfiles.com/cream08-02/program/files.bbs", Nov. 2, 2002.
"Index of/cream08-02 program" http://cd.textfile.com/cream0802/program/?S=A, Nov. 2, 2005.
"Files.chatnfiles.com-/The Pier Shareware 7/038/" http://files.chatnfiles.com/The%20pier%20shareware%207/038/, Nov. 2, 2005.
"MSDOS-Utilities-Install" Ctrl Computer Systems, copyright 1997-2000.
"McAfee Office Version 3.1 User's Guide" Network Associate Technology Aug. 2000.
"GroupShield Exchange User's Guide" Version 4.0.3, Network Associates, Inc., Apr. 1999.
"User Guide: GroupScan and GroupShield for Lotus Notes", McAfee, Inc., Mar. 1997.
"User's Guide: GroupSheild for Lotus Notes" McAfee, Inc., Oct. 1996.
"User's Guide: Groupshield for Windows NT" McAfee Associates, Inc., Nov. 1997.
"McAfee.com Clinic Your online Anti Virus & PC Maintenance Solution User Guide" McAfee.com User Guide May 2001.
DeSimone et al., "Sysctl: A distributed System Control Package" 1993 LISA—Nov. 1-5, 1993—Monterey CA Usenix Association Proceedings of the Seventh Systems Administration Conference (Lisa VIII).
Brown, Mark, "Special Edition: Using Netscape 2" Que Corporation 1995.
"Microsoft Press: Computer Dictionary Third Edition" Microsoft Press, A Division of Microsoft Corp. 1997.
"Microsoft Announces Innovative Security Zones: New Browser Feature Make Security Easier to Understand and Administer" Microsoft Corp. 2002.
"Symantec Jolted by Café" CNET News.com http://news.com.com/2100-1001-279280.html?legacy=cnet.
"Ad-aware: Getting Started" Lavasoft http://tomcoyote.com/Ismanual.html.
Mendelson, Edward, "Jave: Create Your Own Applets" PC Magazine, vol. 16, No. 11, Jun. 10, 1997.
Clyman, John, "Your Guide to Java for 1998" PC Magazine, vol. 17, No. 7, Apr. 7, 1998.
McClanahan, David, "Use Java to Build Dynamic Web Pages" Databased Web Advisor, vol. 15, No. 11, Nov. 1, 1997.
Addamax's UNIX moves Computer Reseller News, p. 54, Nov. 11, 1991.
"Oracle's NCI Introduces NC Software Suite for Both NC Desktop and NC Server Machines" PR Newswire, Apr. 16, 1997.
Randall, Neil, "What Happens When you Click: HTTP: The Underlying Protocol of the World Wide Web" PC Magazine, vol. 15, No. 18, p. 245, Oct. 22, 1996.
Bhatia, Viresh, "The Stirling Group Installshield" chicagobusiness.com.
Goldfayn, Alex L., "Software Installs Profit for Area Firm" Business & Technology Keynote Speeches and Seminars: Article, May 6, 2002.
"You Can't Go There Today" Active X Technology (Info World).
"X.509 Certificates and Certificate Revocation Lists (CRLs)" Sun Microsystems, Inc. May 20, 1998.
Edwards, Brad, "Say Goodbye to Sneakernet Chores with LAN Inventory" LAN Times, Oct. 9, 1995 v. 12 n. 21 p. 85(2).
Coopee, Todd, "ScriptGen Pro 1.0.1: StepUp Utility Simplifies Creation of Installer Scripts" MacWEEK, Jan. 3, 1994 v8 n1 p. 95(1).
Heights, Roslyn, "Cheyenne Announces InocuLAN 4 for Widnows NT—Establishes New Standards For Enterprise Virus Protection" Business Wire, Sep. 9, 1996 p. 9091438.
Steffen, Joseph L. "Adding Run-time checking To The Portable Complier" Software-Practice and Experience, vol. 22(4), 305-316 Apr. 1992.
Kemmerer, Richard A., "Security Issues in Distributed Software".
Giuri, Luigi, Role-Based Access Control in Java™ $3^{rd}$ ACM Workshop on Role-Based Access Fairfax, VA 1998.
Office Action Summary from related Canadian application No. 2,207,162 mailed Apr. 15, 2003.
Foreign Office Action from related Japan application No. H9-151,367 which was dispatched on May 16, 2006.
Office Action from Japanese Application No. 2010-022042 dated Nov. 30, 2010.
Giuri, Luigi, Role-Based Access Control in Java TM 3rd ACM Workshop on Role-Based Access Fairfax, VA 1998.

* cited by examiner

CyberMedia® 1300

Welcome to the *Oil Change* Software Update Page!

DESCRIBE THE UPDATE

Please provide a brief description of this update:
[_____] ~1301

If available, provide URL where additional information regarding this update would be available
[_____] ~1303

What is the new version number?
[_____] ~1305
What is the new version number?
[_]

Which product does this update affect?
(If you are listing multiple products, please separate product names with a comma)
[_____] ~1307

Oil Change allows you to choose one of four different updates:

A Replacement Update affects a specific version already on the PC.
    A Cumulative Update does not require an existing version on the PC.
    A Point Update installs components without changing the version number.
    An Incremental Update only modifies certain portions of a specific version.

Which type of update is this?
[ReplacementUpdate ▼] ~1309

Please list any known incompatibilities
[_____] ~1311

FIG. 13a

SPECIFY WHEN THIS UPDATE IS APPLICABLE

In order to verify that the current product/version is updated, *Oil Change* provides a series of filters for use in establishing additional file criteria. If necessary, you may select one or more of these filters:

☐ LOCATE PREVIOUS VERSION OF THE FILE
Check here if you want the program to scan the full system for previous versions

*What is the name of the file?*          1313
[                    ]

*Where is the file located?*
[RootDirectory(C:\)  ▼]

*Which version should Oil Change look for?*
[SpecificVersion ▼]

If you selected Specific Version,
    enter version to be verified: [         ]

If you selected Multiple Versions,
    enter the version numbers: [         ]
    (for multiple versions, enter the version numbers separated by a comma, i.e. 1.01, 1.02, etc.)

If you selected Version Range,
    enter versions in the range   From: [    ] To: [    ]
    (If searching for all subsequent versions, enter INFINITE in the To: field)

☐ CHECK DATE OF PREVIOUSLY INSTALLED FILE
Select this option if you would like the program to scan the system for the dates of previous versions

*Enter name of file*          1315
[                    ]

*Where is the file located?*
[RootDirectory(C:\)  ▼]

*Which date should Oil Change look for?*
[LookforaSpecificFileDate ▼]

FIG. 13b

If you chose a Specific Date,
  enter date here (mm/dd/yy) [____]
If you selected Latest Date or Date Range, specify the range
  (inclusive) to be checked  From: [____]  To: [____]
  (to search for any date prior to the To: field, specify 00/00/00 in the From: field)

---

☐ CHECK REGISTRY
Select this option if you would like the program to check the registry for product information What is the MajorKey in the Registry?
[HKEY_CLASSES_ROOT ▼]                          1317

What is the MinorKey in the Registry?
(i.e. System\CurrentControlSet\Control\MediaResources)
[_____]

What is the Registry SubKey?
(Enter * if all SubKeys may be used)
[_____]

What is the Registry SubKey Value Name?
(Name of the value in the SubKey, e.g. installer, driver, etc.)
[_____]

What is the Registry SubKey Value Type?
[SpecificVersion ▼]

If you selected Specific Version,
    enter the version number [____]

If you selected Version Range,
    enter versions in the range  From: [____] To: [____]
    (If searching for all subsequent versions, enter INFINITE in the To: field)

If you selected Specific Date,
    enter date here (mm/dd/yy) [____]

If you selected Date Range,
    enter range here  From: [____] To: [____]
    (to search for any date prior to the To: field, specify 00/00/00 in the From: field)

If you selected Specific String,
    how should the strings be compared?
  [Compare String-CASE SENSITIVE ▼]

FIG. 13c

Enter the full Registry String (enter the identifying string your product creates in the Windows Registry)

---

WHERE CAN THE UPDATE BE DOWNLOADED FROM?

Enter the URL of the site where the file is available
for download (If there are multiple files, use a comma to separate the URLs)
[                              ] ── 1319

What file format is being used?
[SelfExtractingFile ▼] ── 1321

☐ Check here if you would like CyberMedia to store your update
  on our local FTP site.

Tell us how to install your product

Specify the installation steps in the order they are to be performed. Please note that some actions will require additional input. Once you have made a selection from the list box, follow the instructions noted on the list entry.

---

INSTALLATION—STEP 1

Select one:    [Execute INSTALL.EXE          ▼]

A—SOURCE/FILE NAME              B—SOURCE DIRECTORY NAME
[          ]                    [RootDirectory(C:\) ▼]        1323

C—DEST. DIRECTORY NAME          D—COMMAND LINE PARAMETERS (optional)
[RootDirectory(C:\) ▼]          [          ]

---

INSTALLATION—STEP 2

Select one:    [Execute INSTALL.EXE          ▼]

A—SOURCE/FILE NAME              B—SOURCE DIRECTORY NAME
[          ]                    [RootDirectory(C:\) ▼]

C—DEST. DIRECTORY NAME          D—COMMAND LINE PARAMETERS (optional)
[RootDirectory(C:\) ▼]          [          ]

---

INSTALLATION—STEP 3

Select one:    [Execute INSTALL.EXE          ▼]

A—SOURCE/FILE NAME              B—SOURCE DIRECTORY NAME
[          ]                    [RootDirectory(C:\) ▼]

C—DEST. DIRECTORY NAME          D—COMMAND LINE PARAMETERS (optional)
[RootDirectory(C:\) ▼]          [          ]

INSTALLATION-STEP 4

Select one: [Execute INSTALL.EXE ▼]

A-SOURCE/FILE NAME
[          ]

B-SOURCE DIRECTORY NAME
[RootDirectory(C:\) ▼]

C-DEST. DIRECTORY NAME
[RootDirectory(C:\) ▼]

D-COMMAND LINE PARAMETERS (optional)
[          ]

Return to Product Registration page

Return to Press Kit

We welcome your comments and suggestions

©Copyright CyberMedia, Inc 1996. All Rights Reserved.

CyberMedia® 1700

Welcome to *Oil Change* Product Registration!

This is an example of the product registration form to be used for *Oil Change*. We welcome your comments and suggestions.

---

PRODUCT INFORMATION

*Company Name:*
[_____] — 1701

*Product Name:*
[_____] — 1703

What type of product is this?
[DeviceDriver ▾] — 1705

How do you uniquely identify this product on a system?
[SignatureFile ▾] — 1707

Identifying file name or character string:
[_____] — 1709

---

If you would like *Oil Change* to use additional product verification filters, please select one or more of the following:

Check Version

Check File Date

Check Registry Entry

Check for Directory

---

☐ CHECK VERSION
Select this option if you would like the program to scan the system for previous versions

FIG. 17a

What is the name of the file?                    1709
[            ]

Where is the file located?
[RootDirectory(C:\)   ▼]

Check for which version?
[AnyVersion      ▼]

If you selected Specific Version,
      which version should we verify? [       ]

If you selected Multiple Versions,
      enter the version numbers: [         ]
    (for multiple versions, enter the version numbers separated by a comma, i.e. 1.01, 1.02, etc.)

If you selected Version Range,
      enter versions in the range  From: [    ]  To: [    ]
    (If searching for all subsequent versions, enter INFINITE in the To: field)

---

☐ CHECK FILE DATE
Select this option if you would like the program to scan the system for the dates of previous versions What is the name of the file?                    1711
[              ]

Where is this file located?
[RootDirectory(C:\)   ▼]

Which date should Oil Change check for?
[LookforaSpecificFileDate ▼]

If you choose a Specific Date,
      enter date here   (mm/dd/yy)[       ]

If you selected Latest Date, what range
      will the date fall between?  From: [     ]  To: [     ]
    (to search for any date prior to the To: field, specify 00/00/00 in the From: field)

If you selected Version Range, enter versions
in the range    From: ☐    To: ☐
(If searching for all subsequent versions, enter INFINITE in the To: field)

If you selected Specific Date,
enter date here    (mm/dd/yy)    ☐

If you selected Date Range,
enter range here    From: ☐    To: ☐
(to search for any date prior to the To: field, specify 00/00/00 in the From: field)

If you selected Specific String,
how should the strings be compared?
| Compare String-CASE SENSITIVE    ▼ |

Enter the full Registry String
☐
(enter the identifying string your product creates in the Windows Registry)

---

☐ CHECK FOR EXISTING DIRECTORY
Select this option if you would like the program to scan for an existing directory

1713

If you selected Version Range, enter versions
in the range    From: ☐    To: ☐
(If searching for all subsequent versions, enter INFINITE in the To: field)

If you selected Specific Date,
enter date here    (mm/dd/yy)    ☐

If you selected Date Range,
enter range here    From: ☐    To: ☐
(to search for any date prior to the To: field, specify 00/00/00 in the From: field)

If you selected Specific String,
how should the strings be compared?
| Compare String-CASE SENSITIVE    ▼ |

Enter the full Registry String
☐
(enter the identifying string your product creates in the Windows Registry)

---

☐ CHECK FOR EXISTING DIRECTORY
Select this option if you would like the program to scan for an existing directory

FIG. 17c

*Which diretory name should be verified?*

*Where is the directory located?*
RootDirectory(C:\)

*(Note: If you have multiple programs using the same information, you must submit a separate verification form for each. After submitting the initial form, use your browser's "back" button to return to this page, then click "Clear Entry" to reset the form. You may then enter new data for additional products.)*

View the Update Registration page

Return to Press Kit

We welcome your comments and suggestions

©Copyright CyberMedia, Inc 1996. All Rights Reserved.

FIG. 17d

SOFTWARE UNINSTALLATION SYSTEM, METHOD AND COMPUTER PROGRAM PRODUCT

RELATED APPLICATIONS

This is a continuation application of prior application Ser. No. 11/378,857 filed Mar. 16, 2006 now U.S. Pat. No. 8,407,683, which, in turn, is a continuation application of copending prior application Ser. No. 11/198,726 filed Aug. 4, 2005, which, in turn, is a continuation of Application Ser. No. 10/456,208 filed Jun. 5, 2003, now issued under U.S. Pat. No. 7,107,366, which, in turn, is a continuation of application Ser. No. 10/264,670 filed Oct. 4, 2002, now issued under U.S. Pat. No. 6,668,289, which, in turn, is a continuation of application Ser. No. 10/136,266 filed Apr. 30, 2002, now issued under U.S. Pat. No. 6,496,875, which, in turn, is a continuation of application Ser. No. 09/661,117 filed Sep. 13, 2000, now issued under U.S. Pat. No. 6,457,076, which, in turn, is a continuation of application Ser. No. 08/660,488 filed Jun. 7, 1996, now issued under U.S. Pat. No. 6,151,643, the disclosure of which is incorporated herein by reference.

FIELD OF INVENTION

The present invention relates to systems and methods for computer-based customer support, and more particularly, to systems, methods, and products for automatically updating software products from diverse software vendors on a plurality of end-user, client computer systems.

BACKGROUND of INVENTION

The typical personal computer contains various categories of software products, such as operating system files, utilities, applications, and device drivers, code libraries, and other forms of computer readable or executable information. In some of these categories, such as applications, the personal computer may contain numerous programs in various subcategories. For example, a user may have one or two word processing applications, several graphics applications, and numerous games. Most of these products will come from different software vendors. As used herein "software vendors" includes any entity that distributes software products, even if the entity also manufactures or distributes hardware or other non-software products. These software vendors frequently improve their products, by adding new features, or by fixing known problems, and make these software updates available to their users. These updates may or may not be free.

There are at least three significant problems that the vendors and users face in attempting to provide these updates to the user. First, vendors face difficulty and costs in attempting to inform users of their products that the updates are available, and users experience similar difficulties in attempting to ascertain what updates are available. Vendors typically send out mailings to registered users, place advertisements in relevant trade journals and magazines, and engage in other promotional activities.

For all of these efforts, many users may remain unaware of the many software updates applicable to their systems until they encounter problems and contact the vendors technical support organizations. Other users only learn about updates by searching the Internet or on-line services for solutions to their technical problems. Just the shear magnitude of the problem of updating all software products can be overwhelming. Given that a user will have many software products from numerous vendors on her computer, it would be nearly impossible for the user to frequently monitor all of the available distribution channels, journals, Internet forums, and the like, to determine for which of the many software products there are updates available.

For example, some vendors maintain sites on the World Wide Web, or electronic bulletin boards (BBS's) that include information about current updates and products, and enable a user to download such updates. However, such sites are obviously dedicated to a single software vendor, and provide information only about that software vendor's products, and certainly not about the products of numerous other vendors that may be interest to a given user. Thus, the user would have to search the Internet, and possibly online services, to determine which vendors have such sites. The user would likely to have visit each of these sites individually and determine what software updates are available from each of them. Similarly, even though some on-line services include forums or other mechanisms where users can learn about available updates, this still places the burden on the user to actively seek out this information. Directories or search engines on the Internet, such as Excite, Yahoo, Lycos, or Infoseek merely provide links to software vendor sites, but do not generally attempt to systematically determine which software updates are available, and provide this information to the user, let alone actually update the software on the user's machine.

Another problem is that even once an update has been identified, there is the need to install it in the user's computer. Many users purchase the software updates by mail order, or the like, and receive them on floppy diskettes. Other users may download the software updates via Internet from the computers of the software vendors, or from on-line services. In any of these cases installing a single update can be a tedious, time-consuming and error-prone process for many users due to the various formats and installation procedures required. Installing updates for all of the numerous software products on a user's system on a regular basis would be even more difficult and time consuming for the typical user.

Finally, many users have concerns about their privacy, and are often resistant to revealing complete information about their software configurations to one or more vendors. However, even for a single vendor, information about which of the vendor's products are installed on a user's computer system, and system configuration information is necessary for determining which updates are applicable to the user's computer system. For example, a certain software update to an accounting program from vendor A might be applicable if the user has a printer from vendor B, and a different software update is applicable if the printer comes from vendor C. The user might not want to let each vendor know about all the components on their system, but this configuration information is necessary to ensure the correct software updated is installed. Still, users are resistant to the prospect of a single vendor storing information profiling the software components that reside on their computer systems.

In summary, from the perspective of an individual vendor, the problems are identifying and notifying every user of the vendor's software of the availability of updates to the software on a timely and useful basis, and ensuring that the proper software updates are installed. From the perspective of the individual user, the problems are systematically and easily identifying which updates are currently available for every piece of software on her system, and resolving the technical difficulties in obtaining and installing such updates.

Accordingly, it is desirable to provide a system that automatically determines which software updates from numerous diverse software vendors are currently available, and which are applicable to a given user's computer system, and installs such user selected ones of such updates on the user's computer. Further, it is desirable to provide such a system without abridging the privacy of users by obtaining and storing system profile information.

SUMMARY OF THE INVENTION

A system, method and computer program product are provided for uninstalling software on a computer. In use, a plurality of software products identified on a computer is displayed. Further, a first user instruction to uninstall at least a portion of at least one of the software products from the computer is received. Such first user instruction is received via an interface. Still yet, the at least a portion of the at least one software product is uninstalled from the computer, in response to the receipt of the first user instruction. Also, a second user instruction may be received, to cancel the uninstallation. Thus, the uninstallation may be cancelled, in response to the receipt of the second user instruction.

BRIEF DESCRIPTION OF THE DRAWINGS

FIG. 13 is an illustration of a user interface for registering a software update into the update database.

FIG. 17 is an illustration of a user interface for registration a software product into the update database.

DETAILED DESCRIPTION OF THE INVENTION

System Architecture

Figure 1:
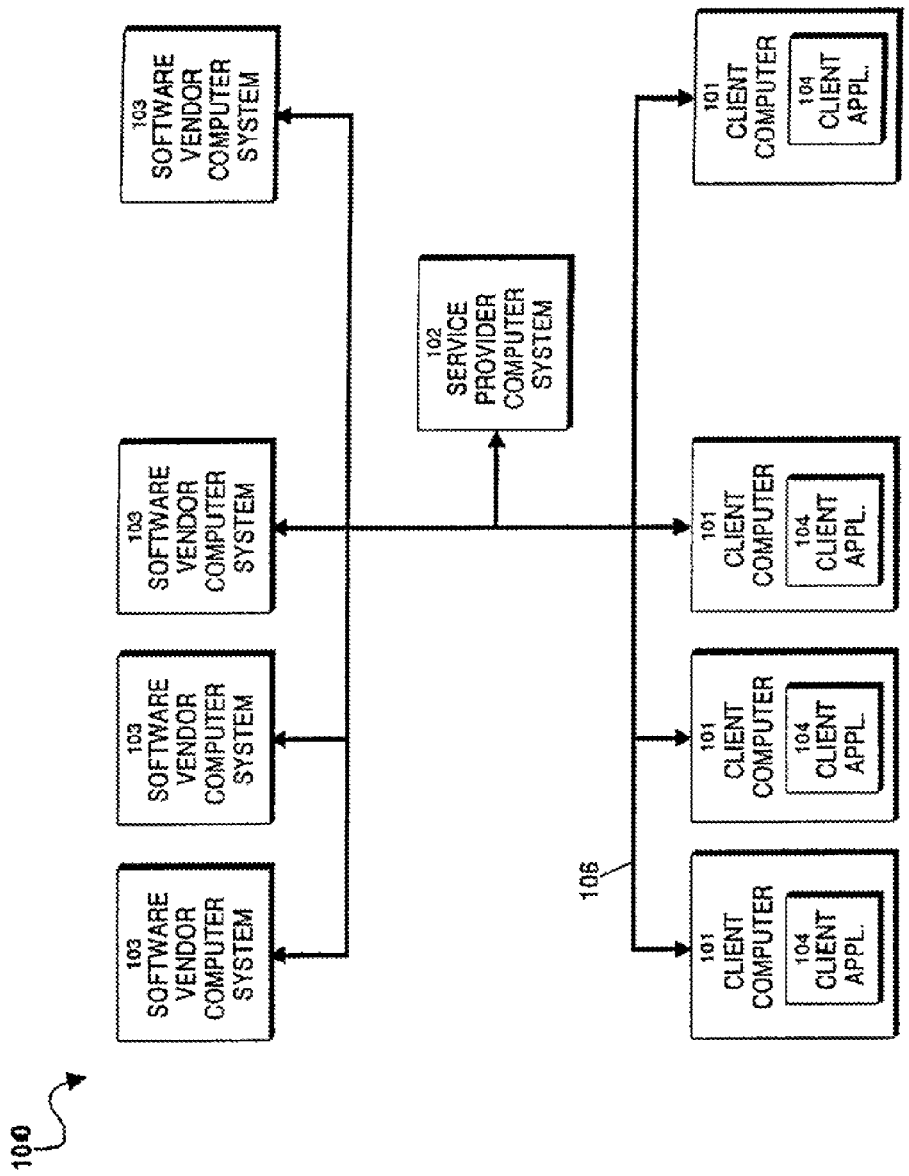
FIG. 1 is an illustration of a system for providing software updates in accordance with the present invention.

Referring now to FIG. 1, there is shown the architecture of one embodiment of a system for updating diverse software products on user's computers in accordance with the present invention. In system 100, there are a plurality of client computers 101 communicatively coupled by a network 106 to a service provider computer 102. A number of software vendor computers 103 are also communicatively coupled over the network 106 to the service provider computer 102. The network 106 is preferably the Internet, or other similar wide area network.

Each client computer 101 is operated by an end user, and typically has a number of software products installed thereon, such as applications, drivers, utilities and the like. In accordance with the present invention, the client computers 101 includes a client application 104 that communicates with the service provider computer 102 to obtain software updates of software products installed on the client computer 101. The software architecture of a client computer 101 and client application 104 is further described below with respect to FIG. 7.

Each software vendor computer 103 coupled to the service provider computer 102 stores software update information, software products, information files, and the like. The software update information includes applications, binary files, text files, and the like, for updating software products installed on client computers 101, and advertising or other information about such products useful to users for evaluating potential software for updating. Other types of information useful to providing product support, technical service, or the like may also be beneficially provided. In addition, the software vendor computers 103 provide mechanisms for controlling distribution and payment of software updates, such as credit card payment front ends, code authentication and verification subsystems, and the like. These various mechanisms are understood in the art. For example, payment mechanisms may be implemented in compliance with various credit card or debit systems, as known in the art. Likewise, authentication and verification may be implemented using conventional encryption techniques.

In a preferred embodiment, the network 106 is the Internet, and more specifically, the World Wide Web portion thereof. The various computers thereby support the protocols for FTP, and HTTP, and provide for the display and rendering of HTML, VRML, or other text or interface description languages. Each computer 101, 102, 103 has a address that specifies its location on the network 106, thereby allowing such computers to communicate with each other in a conventional manner. Files, such as executables, binaries, and text files are identified within the various computers by universal resource locators (URLs) as known in the art.

Overall System Operation

Figure 2:
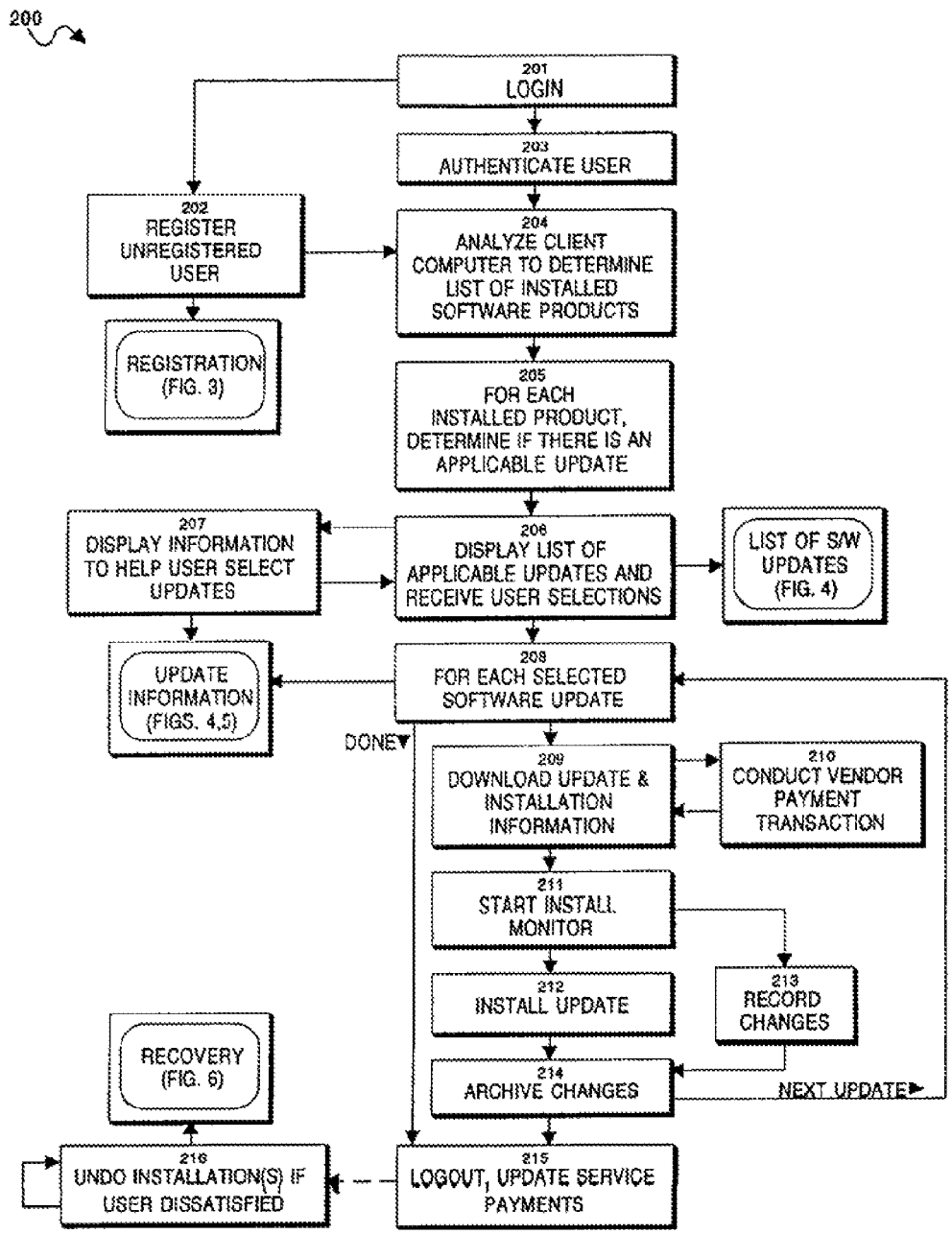
FIG. 2 is a flowchart of the overall method for providing software updates to a client computer in accordance with the present invention.

Referring now to FIG. 2, there is shown an overall flow diagram of the process of updating a single client computer 101 in accordance with the present invention. The process here is described with respect to a single client computer 101. Given the client-server nature of the system, those of skill in the art understand that numerous other individual client computers 101 may interact with the service provider computer 102 in parallel.

The update process 200 is typically initiated on the client computer 101. The user may manually initiate the process, or it may occur automatically, for example at preset periods, such as once a month. Alternatively, the process may be initiated by the service provider computer 102 prompting the client computer 101 at various intervals, or in response to particular events.

Figure 3:
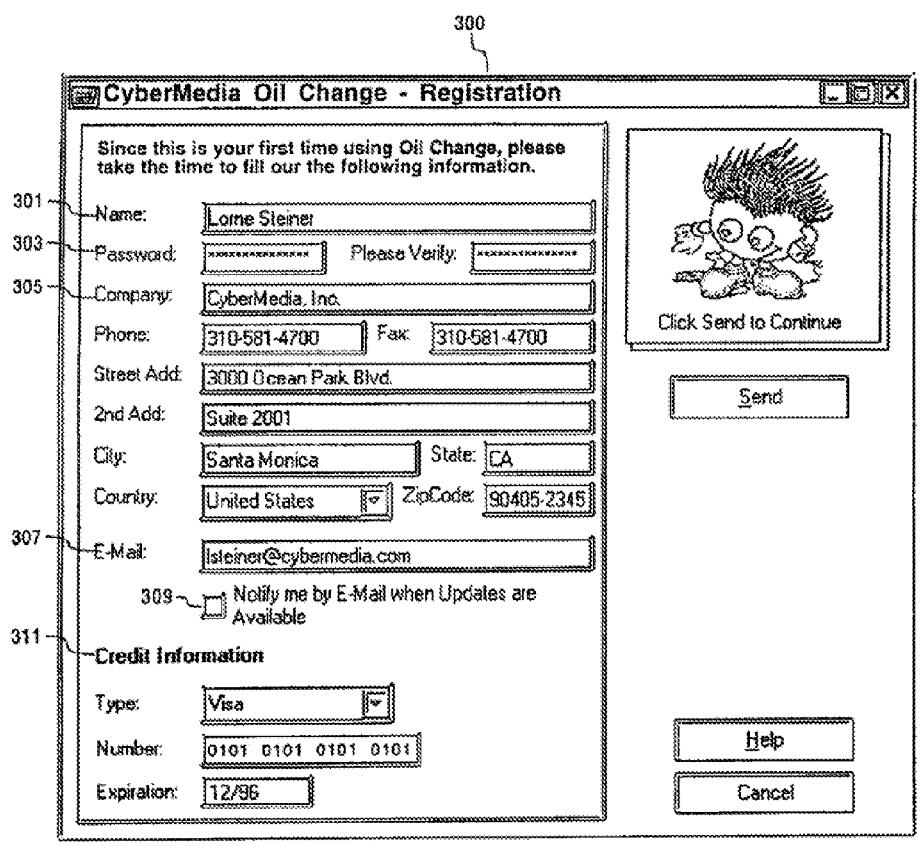
FIG. 3 is an illustration of a user interface for registering a new user of the updating service.

In each case, the user logs in 201 to the service provider computer 102 with the client application 104 in a conventional manner, providing a user ID, a password, and the like. This information may be manually entered by the user via the client application 104, or more preferably, stored within the client application 104, and automatically provided once a connection between the client computer 101 and service provider computer 102 is established. If the user is not registered, then the service provider computer 102 in conjunction with inputs by the user, registers 202 the new user of the system. FIG. 3 illustrates a basic user interface 300 for registering the user. The user identifies himself or herself by name 301 and selects a password 303. The user may also provide a mailing address 305 and a payment mechanism such as a credit card data 311, including a credit card number and expiration date, to pay for the services and for any for-fee software updates that the user may access in the course of using the service provided by the service provider computer 102. An email address 307 is entered to allow the service provider to contact the user by email. The user may select check box 309 to indicate that they want to be notified by email when new software updates are available for software products installed on their computer. When the registration process 202 is completed, the service provider computer 102 returns a unique registration number to the user. This number may be stored on the client computer 101 and used during subsequent logins to identify the user to the service provider computer 102.

The registered users are authenticated 203 by the service provider computer 102, using conventional authentication mechanisms, such one or more passwords, digital signature, certificates, or the like. Authentication ensures that only users who are properly authorized by the service provider can obtain updates for software products.

The client application 104 then analyzes 204 the client computer 101 to determine a list of installed software products. The list of installed software products typically includes applications, system utilities, drivers, and other executables or resources. These software products will typically be from numerous diverse software vendors, a number of whom will maintain software vendor computers 103 on the network 106.

For each of the installed software products on the list, the client application 104 determines 205 if there is an applicable, or relevant update for the software product. This determination is made in consultation with the service provider computer 102, which maintains, as further described below, a database including a list of available software updates for numerous software products of diverse software vendors.

Figure 4:
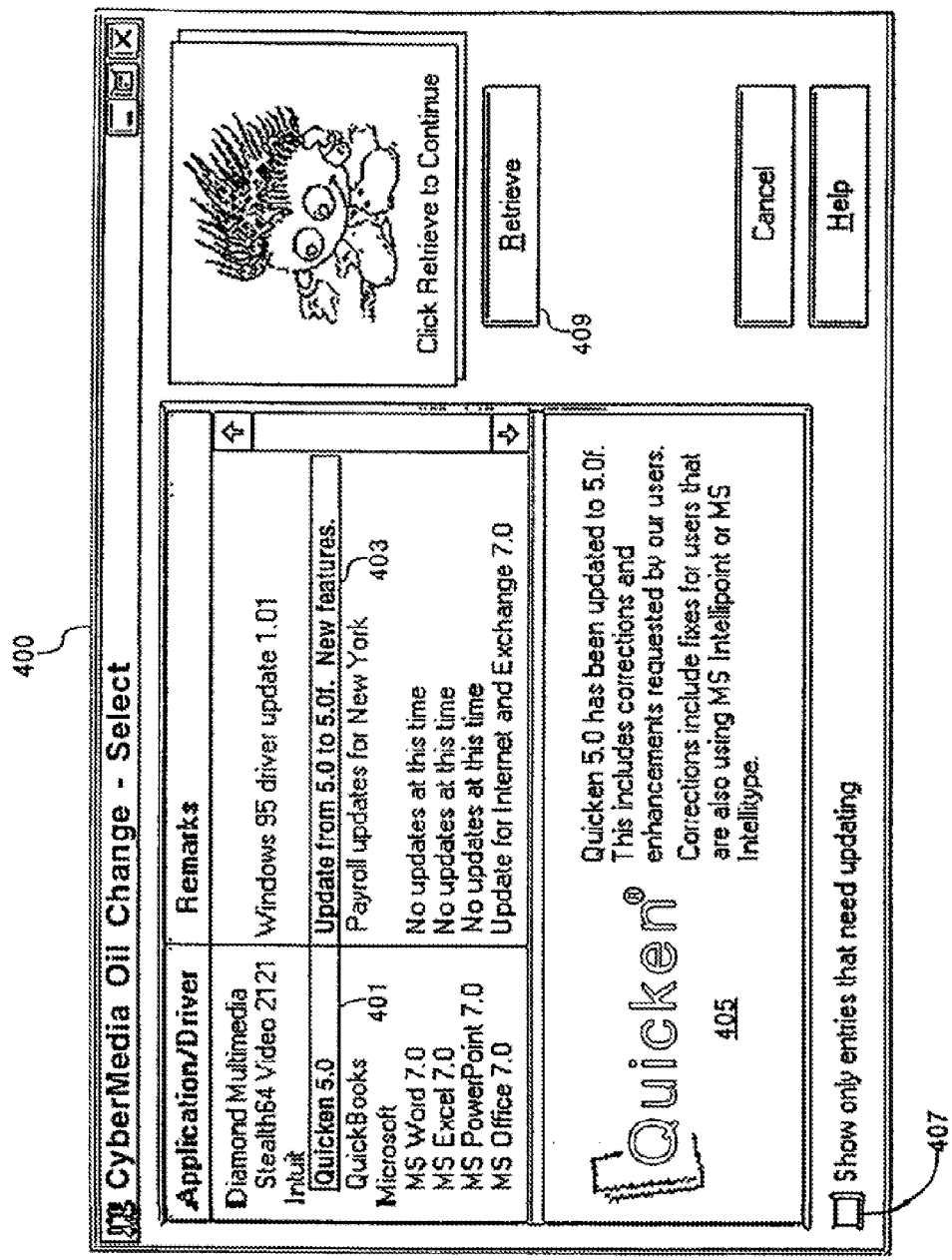
FIG. 4 is an illustration of a user interface for selecting software updates for installation.

The client application 104 displays 206 the list of applicable software updates to the user, for review and selection thereof of updates for purchase and installation. FIG. 4 illustrates a sample user interface display 400 of applicable software updates. This display 400 includes the name 401 of each software product identified on the client computer 101, and remarks 403 displayed next to the name indicating whether the software product is already up-to-date, that is, there are no applicable updates, or, if the product is not current, the list of applicable updates (which may be for the software product itself, or for related products). In those cases where there is an applicable update, the remarks 403 briefly indicate the nature of the software update. In the example of FIG. 4, the remarks 403 for the software product Quicken 5.0® by Intuit Inc., indicates a update to provide new features. The user may obtain additional information by selecting a name or remark of a particular software product. The selected product name and remark is highlighted, as shown in FIG. 4, and the information about the software update is displayed 207 in an information window 405. This information may be stored in the service provider computer 101, or obtained directly from the software vendor computers 103 as needed using URLs associated with such information. The user may limit the list to only those software products that need updating, rather than all installed software products, by selecting check box 407.

The user may select one or more software products to update. To update one of the software products, the user selects the software product for update by selecting (e.g. double-clicking) the line including the software product, or by single clicking on the line, and then clicking the retrieve button 409. The user may select more than one software update by holding the control key on the keyboard down while single-clicking on the name of each desired software update, followed by selecting the retrieve button 409. When all the desired updates have been selected, the user may click on the continue button 411 to begin the installation process.

Figure 5:
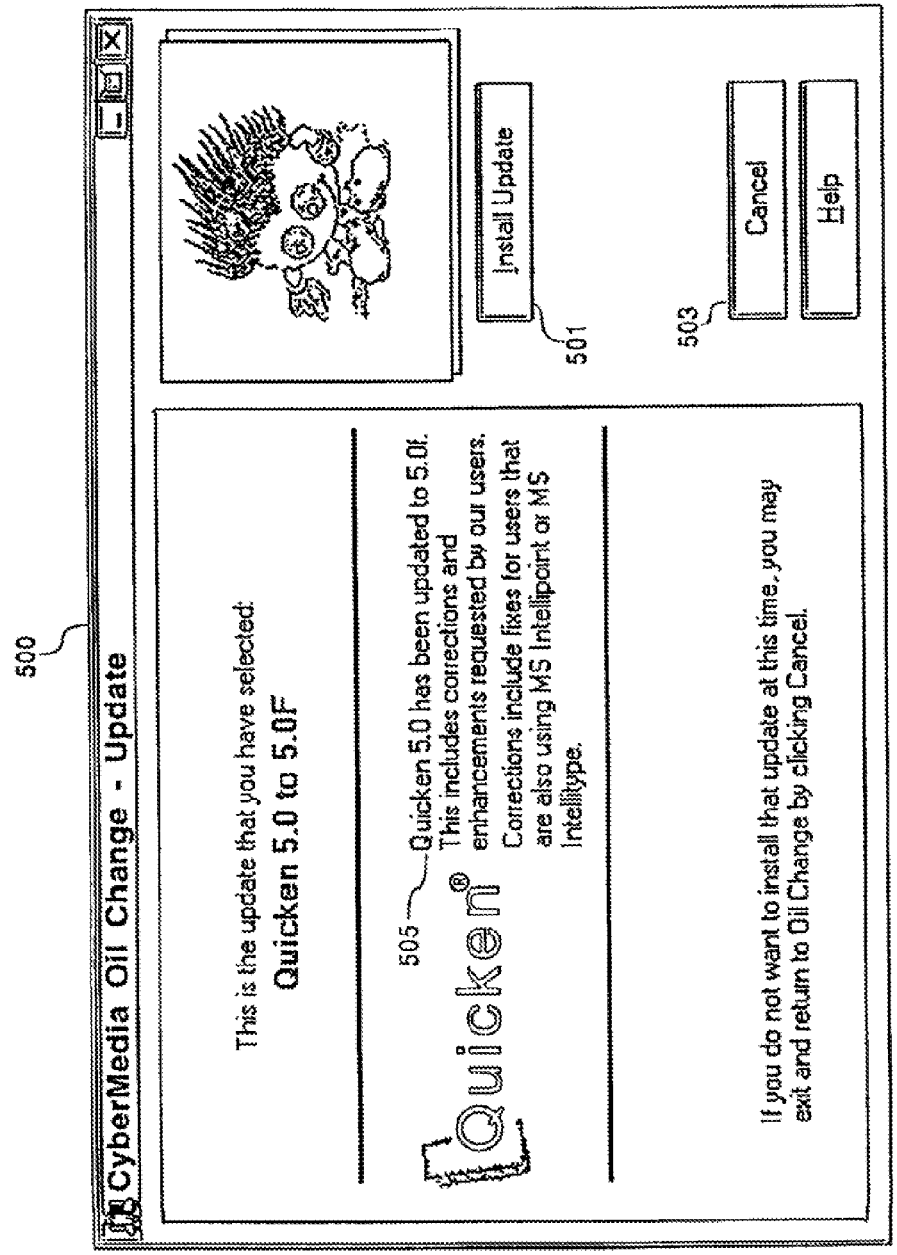
FIG. 5 is an illustration of a user interface for confirming installation of a software update.

For each selected software update, the client application 104 performs an installation process 208. Referring to FIG. 5, the client application 104 displays information 505 for a selected software update, and provides the user the opportunity to confirm 501 or cancel 503 the installation. If confirmed, the client application 104 downloads 209 the software update, along with installation information, such as installation programs, files, and the like. This downloading may be directly from the software vendor computer 103, using the URL data stored in the service provider computer 102 for the location of the software update on the network 106.

In conjunction with the downloading process 209, a payment transaction 210 may be conducted whereby the user of the client computer 101 pays for the software update if it is not a free update. The service provider computer 102 may intermediate in this transaction, or merely initiate the transaction by connecting the client application 104 to the computer 103 of the software vendor of the update. If payment information, such as credit card numbers, are stored in the client application 104, then this information maybe provided by the client application 104 to the software vendor computer 103.

Once the download and applicable payment are complete, the software update is physically installed on the client computer 101. Each software update is associated with information that describes the particulars for the installation, such as configuration, decompression or other information. The installation is performed in conformance with such information.

In the preferred embodiment, the client application 104 executes 211 an install monitor prior to actually installing the software update. The install monitor, as further described below, records the changes made to the client computer 101 as a result of the installation of the software update. This information is archived by the install monitor and allows the user to "undo" or remove any number of installations, and restore the client computer 101 to its state prior to each such installation. Accordingly, the client application 104 performs 212 the installation, executing any necessary decompression, installation, or setup applications necessary to install the software update. During the installation process 212 the install monitor records 213 any changes made to the system configuration, including changes to various configuration files, additions or deletions of files, and additions or deletions of directories. The changes may be recorded in a variety of manners, such as building descriptions of the modifications of the files, or alternatively, storing copies of files prior to their alteration or deletion. Once the installation is complete, the install monitor archives 214 the changes. This process 208 is repeated for each software update to be installed.

Once all of the software updates have been installed, the client applications 104 logs out 215 of the service provider computer 102, and any necessary payment information for the user may be updated, such as payment based on the number of software updates purchased, the online connection time, and the like. Alternatively, no payment may need to be directly made, as the cost of the service may be included in the cost of the software update charged by the software vendor, who then pays the service provider for the service of coordinating and linking end users to the software vendor's computer system 103.

At some subsequent point, the user may decide to undo a previous installation, for example, due to dissatisfaction with the software product.

Figure 6:
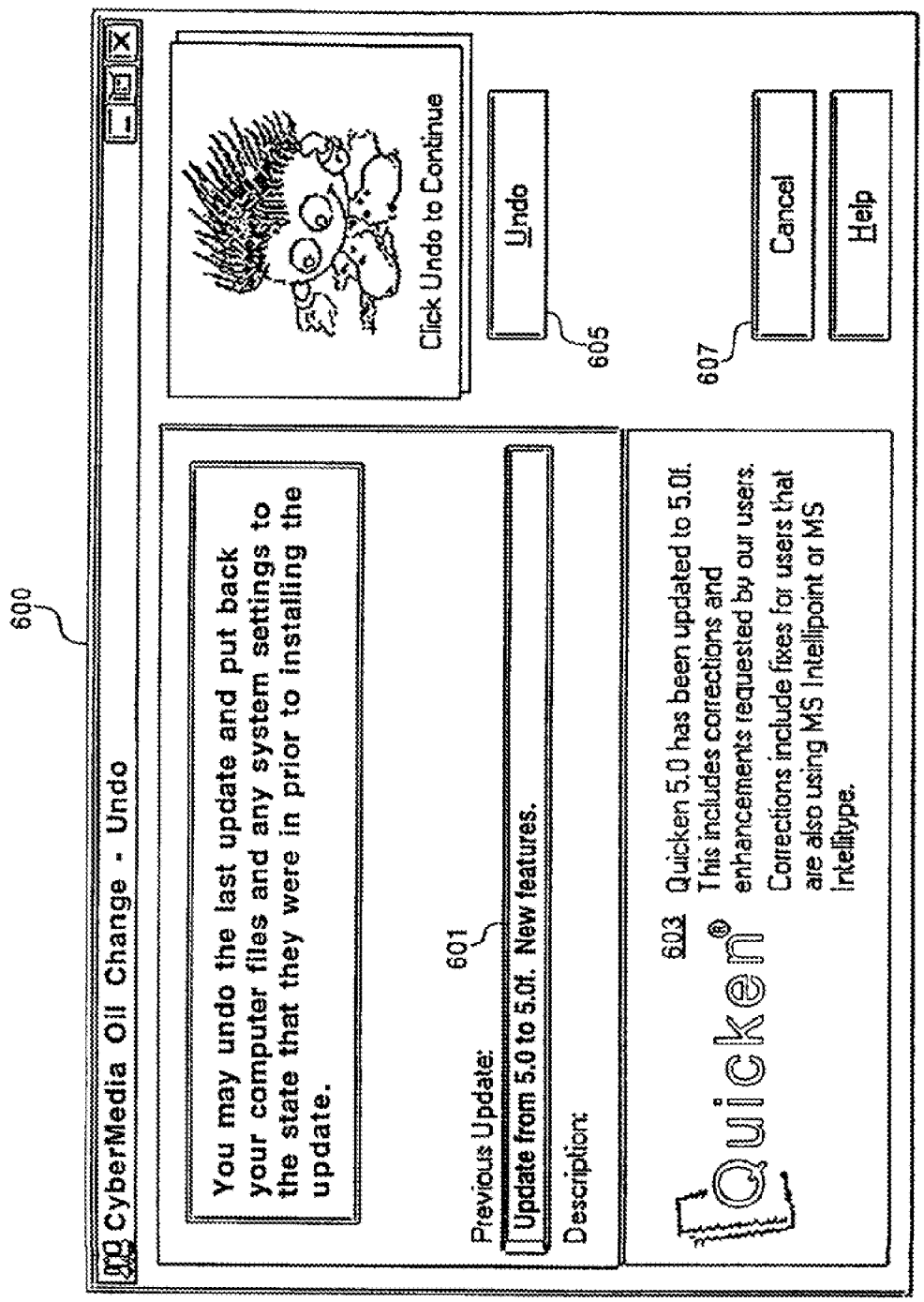
FIG. 6 is an illustration of a user interface for undoing an installation of a software update.

The user may use a recovery feature of the client application 104 to undo 216 the installation. A sample user interface 600 for the recovery function is illustrated in FIG. 6. The user interface 600 includes a field 601 indicating the previous update to be removed as selected by the user, along with an information window 603 describing the software update. The user confirms the removal of the software update by selecting the undo button 605, or may cancel with cancel button 607. The recovery function deletes the files installed for the software update, and using the archived information created by the install monitor during the installation of the product, restores the client computer system 101 to its configuration immediately before the installation of the product. This process 216 includes deleting files and directories that were added, restoring files and directories that were deleted, and restoring files that were otherwise changed. In one preferred embodiment, the recovery function is able to undo any installation in a given series of installations, accounting for changes to the configuration of the client computer 101 after a particular installation. In another preferred embodiment, the recovery function undoes installations in the reverse order of their installation. If any payments were originally required from the user for the cost of the software update and the associated service of downloading and installing it, the payments may be credited back to the user when the user undoes the installation.

Service Provider Computer

Figure 7:
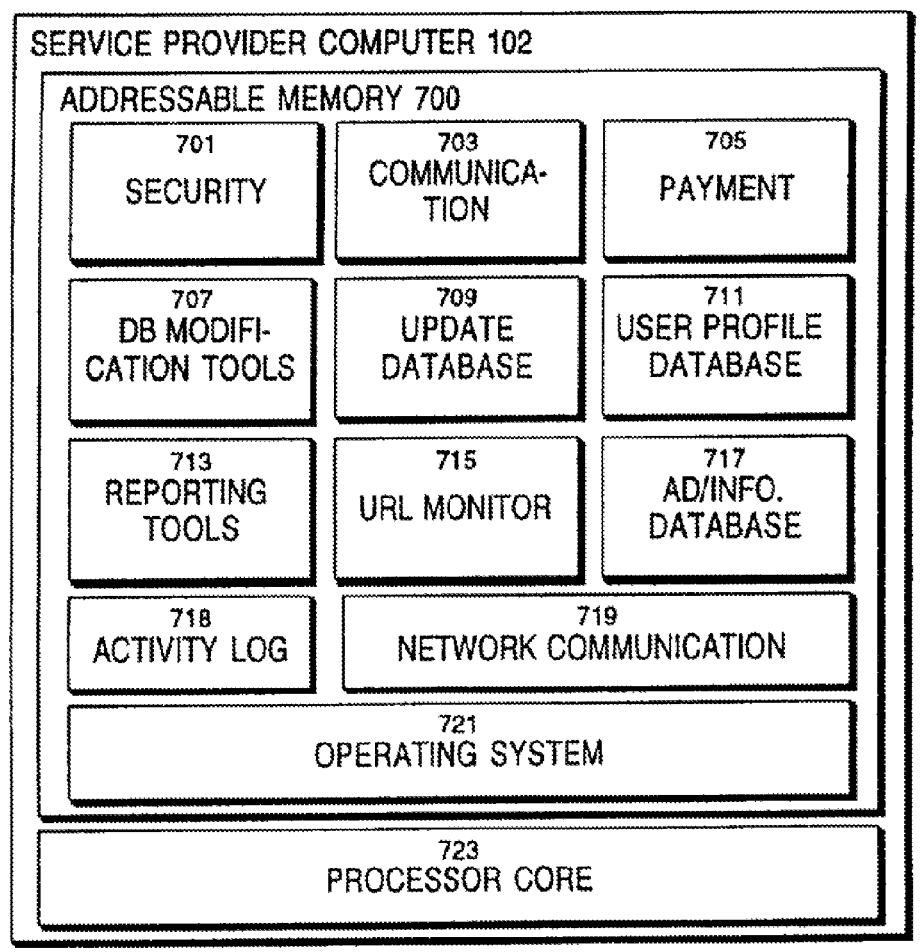
FIG. 7 is an illustration of software architecture of the service provider computer system.
Figure 8:
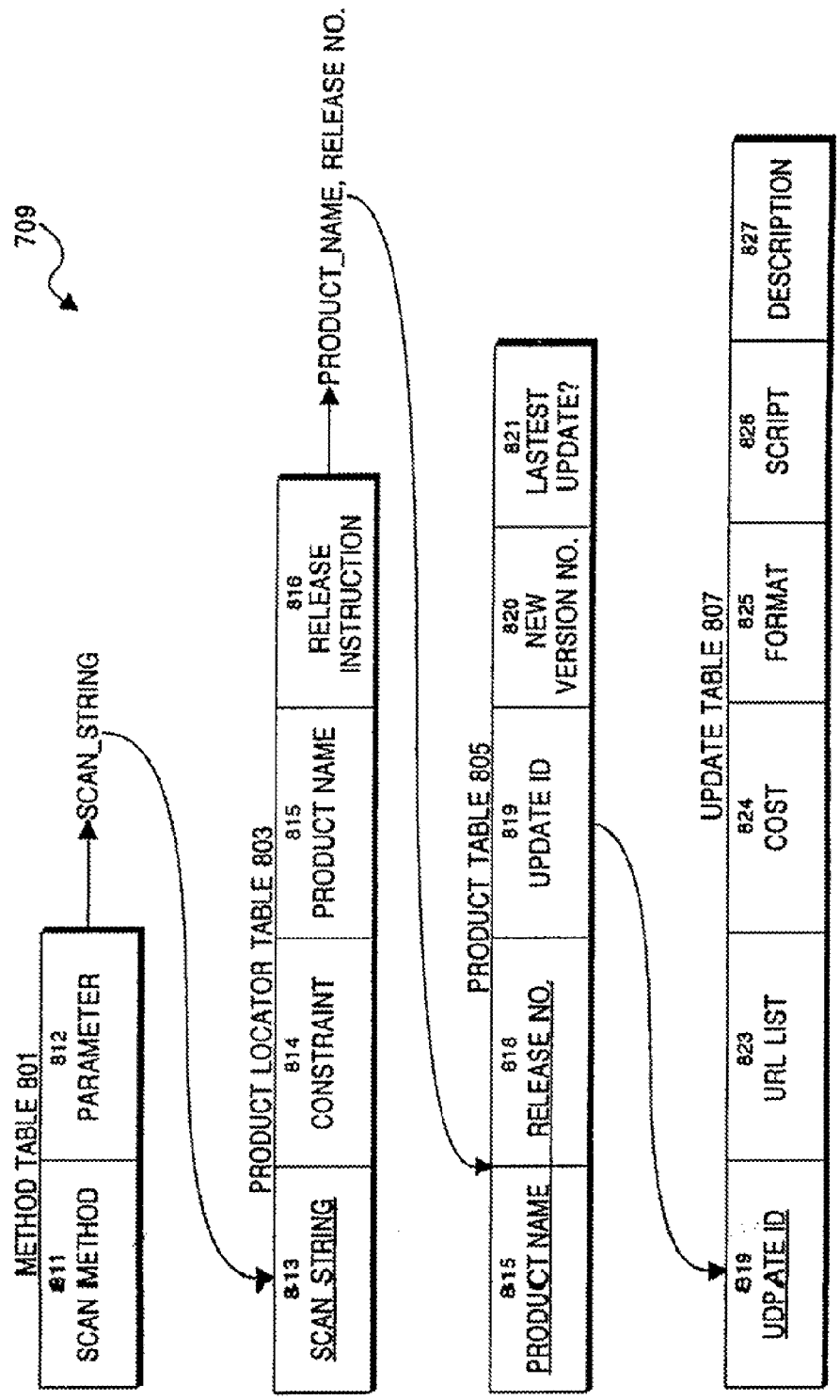
FIG. 8 is one embodiment of a schema for the update database of the service provider computer.

Referring now to FIG. 7, there is shown one embodiment of the service provider computer 102 in accordance with the present invention. In terms of hardware architecture, the service provider computer 102 is conventional server type computer, preferably supporting a relatively large number of multiple clients simultaneously for requests for data and other processing operations. The service provider computer 102 includes one or more conventional processors in a processor core 723, and a suitable amount of addressable memory 700, preferably on the order of 18-64 Mb. The service provider computer 102 may be implemented with an Intel-based computer including one or more Pentium® processors, or other more powerful computer, such as various models of Sun Microsystems' SparcStations using UltraSparc® processors. The service provider computer 102 executes a conventional operating system 721, such as Windows NT® from Microsoft Corp., or one of various UNIX-based operating systems, such as Sun Microsystems' Solaris 2.5. The service provider computer 102 further includes a network communication protocol layer 719 that implements the necessary TCP-IP communication functions for connecting to the network 106 and communicating with other computers.

In accordance with the present invention, the service provider computer 102 includes a number of executable components and database structures useful for managing the software update interactions with the client computer 101 and the software vendor computers 103. These components include a security module 701, a communications module 703, a payment module 705, database modification tools 707, a update database 709, a user profile database 711, a reporting tools module 713, a URL monitor module 715, an advertising/ information database 717, and an activity log 718. The update database 709 is described here; the remaining components are described further below.

Update Database

The update database 709 maintains information identifying a large number of software products, information about the software updates that are available from the diverse software product vendors for these software products, information for identifying software products installed on a client computer 101, and for uniquely distinguishing the versions and names of installed software products.

In one embodiment, the update database 709 does not itself store the software updates, but rather stores information, such as URLs, that allows the service provider computer 102 or the client computers 101 to directly access the software updates from the software vendor computers 103. This implementation is chosen for several reasons. The system 100 is designed to provide software updates for large numbers of software products, on the order of hundreds, and perhaps thousands of products. In this situation, extremely large amounts of storage would be required to store the relevant files. Further, by not storing the software updates themselves, but only links to the software vendor computers 103, the service provider does not have to make sure that the software updates themselves are always current, but need only maintain the link information, which is administratively easier. In another embodiment, the software updates are stored in the updated database 709. This implementation is useful, for example, to facilitate synchronization of updates of the database 709 itself with the releases of new software updates for software products, thereby ensuring that the entries in the database 709 are consistent with the current releases of new software updates.

Finally, the update database 709 may also store information describing an installation process for installing a software update. This information may include particular configuration, file format, or other data useful to performing the installation of the software update the client computer 101. This information, if present, may be provided to the client computer 101 to use during the installation of the software update.

Figure 9:
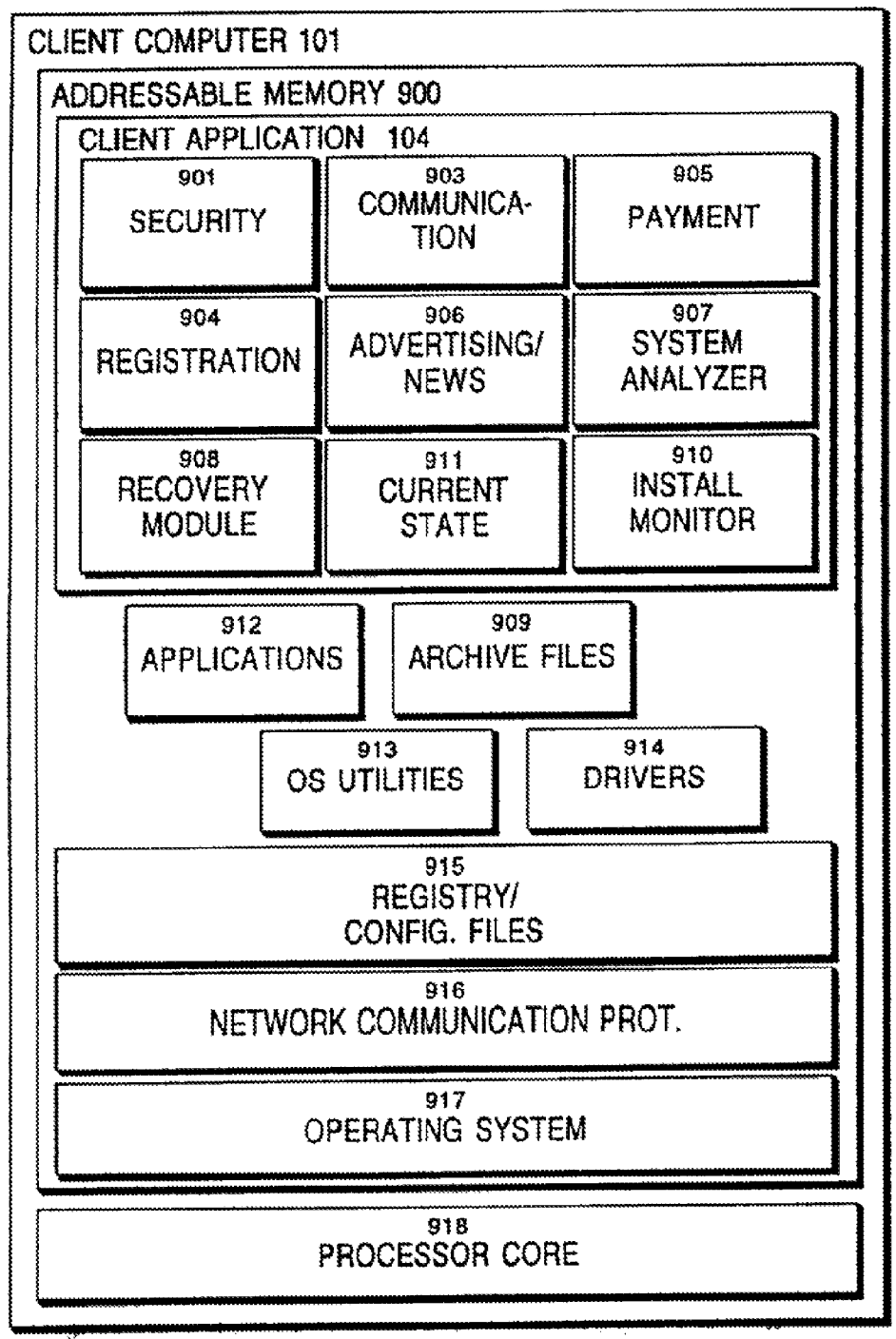
FIG. 9 is an illustration of the software architecture of an client computer.

The update database 709 may be implemented in a variety of ways. Referring now to FIG. 3 there is shown one implementation of the update database 709, illustrated as a schema for a relational database. In this embodiment, the update database 709 includes 4 tables: a method table 801, a product locator table 803, an product table 805, and an update table 807. FIG. 9 illustrates a flowchart of the process of analyzing the client computer 101 using the tables of the update database 709.

The method table 801 maintains information identifying various methods of analyzing a client computer 101 to determine which software products are installed thereon. The method table 801 includes scan methods 811 and parameters 812. The various scan methods 812 are designed to cover the variety of different facilities of a client computer 101 that may identify the installed products. For example, in a client computer 101 using Microsoft's Windows95 or Windows NT operating system, there is provided a Registry which is designed to maintain indicia of installed software products. The Registry includes various methods that can be called to return information about the software products identified therein. Some of these methods are listed in the scan methods 811. The parameters 812 are arguments to the Registry methods, for example, identifying specific aspects of the Registry to be searched.

While compliance with the Windows95 standard requires that a to software vendor's installation procedure should update the Registry, not all software vendors comply. In this case, information identifying the installed software products is also maintained in the config.sys, system.ini, and the autoexec.bat files. Also, a client computer 101 may be using Microsoft Corp.'s MS-DOS or Windows 3.1 operating systems, which do not use the Registry. Accordingly, the scan methods 811 include methods for reviewing these system files and returning indicia of the installed software products.

Each of the scan methods 812 return indicia of the installed products in the form of a number of strings, here scan_string. Each scan_string identifies a product name or file name, or some other data. However, a scan_string may not uniquely identify a product. For this reason, the scan_string is resolved by the product locator table 803.

The product locator table 803 associates individual scan_strings 813 with a product name 815, instructions 816 for determining a version number or release number, and one or more constraints 814. The constraint is a rule that uniquely identifies the product given contextual information for the product where there are two entries having identical scan_strings. Constraints include specific directories that include the product, additional entries in the system configuration file, the Registry or the like. If the specified information in these various locations matches the constraint values, then the product name associated with the constraint is the correct product name for the scan_string. In one embodiment, the constraint 814 is an executable procedure that retrieves information in these various locations, and determines from this information whether the product name is a match with the scan_string, according to whether the specified details of the constraint are found in the client computer 101.

Since some of the installed software products will be in their most current version, it is not necessary to update all software products installed on the client computer 101. Rather, from the list of installed software products, further analysis (205, FIG. 2) determines for which of these software products is there an applicable software update. A software update is applicable to a client computer 101 if version of the software update is more recent than the version of the installed software product.

Since not all of the software products installed on a client computer 101 need to be updated, the determination of the applicable software updates is usefully made with the product table 805. The product table 805 associates a product name 815 and a particular release 818 with an update ID 819 identifying a software update for that version of the product. The new version number 820 specifies the new version that would be produced by applying the software update specified by the update ID 819 to the software product identified by the product name and release number. The latest field 821 specifies (Y/N) whether applying the software update would bring the product to its most up-to-date version.

Finally, the update table 807 stores the information necessary for performing the software update itself. This table is usefully keyed by the update ID 819. For each update, there is provided a URL list 823 which contains URLs for the various sites that store the actual binary files for the software update, typically the software vendor computer system 103, and potentially mirror sites. The URL list 823 is comprised of a number of URL entries, each URL entry having a URL and a timestamp of the last time the URL was validated, and flag indicating whether the URL is valid. This allows the URL monitor 715 to ensure that current URL information is maintained in the database.

The current cost 824 of the software update is also stored to provide the user with cost information for the software update.

The format 825 specifies the file format of the software update files, and thereby indicates the type of processing needed to install the software update files. In one embodiment, there are six formats and accompanying installation procedures:

TABLE 1

| Format | Installation Procedure |
| --- | --- |
| zip | 1) Unzip file with unzip.exe |
| | 2) Run install.exe |
| zip | 1) Unzip file with uzip.exe |
| | 2) Run setup.exe |
| self-extracting archive | 1) Execute file to extract |
| | 2) Run install.exe |
| self-extracting archive | 1) Execute file to extract |
| | 2) Run setup.exe |
| file.exe | 1) Execute file for self extraction and installation. |
| unknown | 1) use script information to perform installation. |

With respect to unknown or custom formats, the update table 807 stores in the script 826 either a handle to a custom installation program that is provided either by the software vendor for the update, or by the service provider. In addition, the script 826 also stores information about any conditions that are required for the installation, such as turning off antivirus programs, or other conflicting programs during the installation process.

The description 827 field stores data associated with a description of the software update, such as describing the product features. The description is preferably a URL to a file, on the software vendor computer system 103 that contains the description information. Again, the actual text need not be stored here, but merely a link to where that information is available on the network 106.

The update database 709 has been described as a set of tables. Alternatively, the update database 709 may be implemented in an object oriented framework with each table being a class, and the fields of the tables being attributes and methods of the class. The class type is then usefully defined by the primary key of the table.

Client Computer

Referring now to FIG. 9, there is shown an illustration of the hardware and software architecture of a client computer 101. A client computer 101 is of conventional design, and includes a processor core 918, an addressable memory 900, and other conventional features (not illustrated) such a display, a local hard disk, input/output ports, and a network interface. The display is of conventional design, preferably color bitmapped, and provides output for a user interface for various applications, such as illustrated in FIGS. 3-6. The input/output ports support input devices, such as a keyboard, mouse, and the like, for inputting commands and data. The network interface and a network communication protocol 916 provide access to remotely situated mass storage devices, along with access to the Internet, with a TCP-IP type connection, or to other network embodiments, such as a WAN, LAN, MAN or the like.

In the preferred embodiment the client computer 101 may be implemented on a Intel-based computer operating under Microsoft Windows 3.1 or Windows95 operating system 917, or equivalent devices. The client computer 101 includes some number of configuration files 915, such as the Windows95 Registry, the system.ini, config.sys and other files.

The client computer 101 further has installed thereon software products in the form of applications 912, operating system utilities 913, and device drivers 914, and the like. These various software products are among those that will be updated by the service provider computer 102.

In accordance with the present invention, the client computer 101 executes the client application 104 in memory 900. The client application 104 is comprised of a number of executable code portions and data files. These include a security module 901, a communications module 903, a payment module 905, a registration module 904, an advertising and news module 906, a system analyzer 907, a recovery module 908, an install monitor 910, and data defining the current state 911 of the application. The client application 104 further maintains in a private area of the computer storage archive files 909 that archive the state of the client computer 101 prior to each update installation. The client application 104 may be provided to the client computer 101 on a computer readable media, such as a CD-ROM, diskette, 8 mm tape, or by electronic communication over the network 106, for installation and execution thereon.

Analysis of Installed Software Products and Determination of Applicable Updates

In the preferred embodiment, the analysis 204 is preferably performed by the client application 104 on the client computer 101. This reduces the network bandwidth required, and the potentially unreliability of non-stateless remote procedure call implementations by having the service provider computer 102 perform the analysis. It further increases the number of simultaneous users of the service provider computer 102. The analyze process is performed by the system analyzer 907 module of the client application 104.

In this embodiment then, the client computer 101 stores a local copy of the method table 801 and the product locator table 803 and uses these local copies to perform the analysis.

Figure 10:
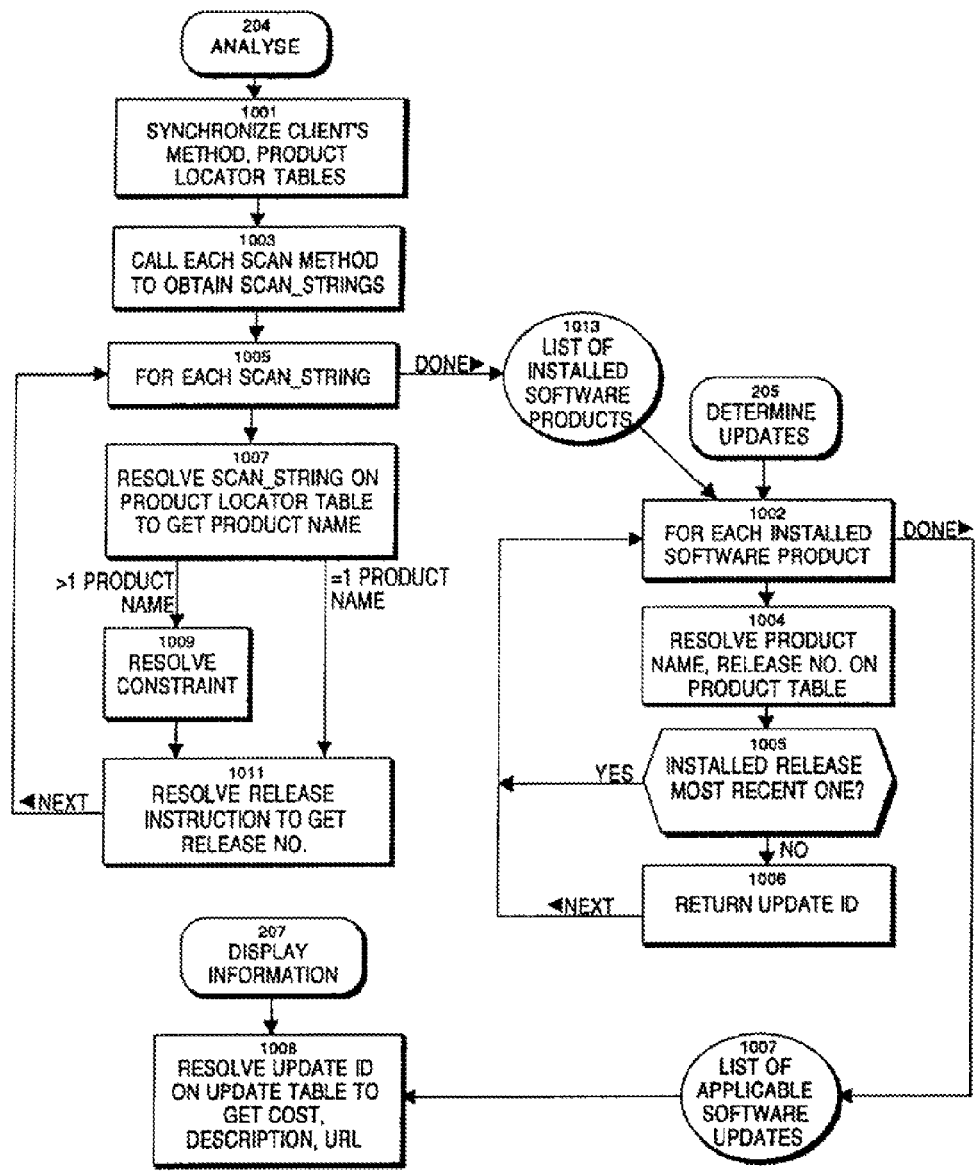
FIG. 10 is a flowchart of further details of analyzing the client computer, determining software updates, and displaying update information.

Referring now to FIG. 10 there is shown the process of the system analyzer 907 for analyzing 204 the client computer 101 to determine the list of installed software products.

The system analyzer 907 first synchronizes 1001 the method table 801 and the product locator table 803 in the client computer 101 with the current versions held by the service provider computer 102. Preferably each table is replaced in its entirety; this is likely to be faster than comparing individual entries and updating only those that are out of date. The synchronization may be mandatory or conditioned by version on client computer 101 being is older than the version on the service provider computer 102, as indicated by stored timestamp of last time the update table 709 in the service provider computer 102 was updated.

Once the tables are synchronized, the system analyzer 907 can operate locally, for improved efficiency. The system analyzer 907 traverses the entire method table 801, and invokes 1003 each scan method 812 to search the Registry and configuration files 915 of the client computer 101. Each scan method 811 outputs a scan_string, as described, specifying some software product installed on the client computer 101.

The system analyzer 907 applies (1005) each of the scan_strings to the product locator table 803. The product locator table 803 receives the scan_string and resolves 1007 the scan_string to determine a product name 815 and a release instruction 816 associated with it. In some cases, the scan_string does not uniquely identify a product name 815, but matches several product names of installed software products. Accordingly, for each matching entry, the system analyzer 907 obtains 1009 a constraint 814 from the product locator table 803, and resolves 1009 the constraint to determine whether product on the client computer 101 is in fact the product listed in the entry. The constraint 814 of one of the entries will be satisfied and uniquely identify the product name.

Once the specific entry with the correct product name is identified, the system analyzer 907 resolves 1011 the release instruction 816 for the entry to obtain the release or version number of the installed software product. The release instruction 816 is preferably an executable procedure that obtains the version number from the named software product, and thus not merely the actual data itself. Using an executable procedure here ensures that the obtained release or version number is actual value for the product.

The result obtained by the system analyzer 907 from the product locator table 803 is a list 1013 of the installed software products on the client computer 101, each product identified by name and the installed version. The system analyzer 907 uses this list to query the service provider computer 102 to determine 205 for which of these products there is an applicable update.

For each installed product (1002) the system analyzer 907 queries the service provider computer 102 to resolve 1004 the name 815 and release number 818 of the product and determine if there a current update 821 for the product. This may be done by passing in the entire list as name, value pairs, or individually quarrying the service provider computer 102. In either cases, the service provider computer 102 determines if there is an applicable update for a software product by comparing the product name 815 and release information 818 to the product table 805, and obtaining the information in the latest update field 821. If there is an update available, in that the release information in the table indicates a version later than the version that is installed on the client computer 101, then the service provider computer 102 returns 1006 a handle the update ID 819 to the system analyzer 907. If the release of the software product installed on the client computer 101 is the most recent version, then the service provider computer 102 checks the next entry. This process continues until all of the installed software products are checked.

Selection of Software Updates

Once all of the installed software products have been reviewed against the product table 805, the system analyzer 907 will have a list 1007 of the applicable software updates, as those products for which it received an update ID 819 from the service provider computer 102. The system analyzer 907 can then display 206 the list to the user. An exemplary user interface is described above with respect to FIG. 4.

The system analyzer 907 can further display 207 additional information for a software update, as illustrated in FIG. 5, by querying the service provider computer 102 with the update ID 819 of a particular product to resolve 1008 the update ID 819 on the update table 807 and return information, such as cost, description, and the like.

Installation of Software Updates and the Install Monitor

The user selects one or more of the list software updates. For each selected update, system analyzer 907 returns the update ID 819 to the service provider computer 102. The service provider computer 102 resolves the update ID 819 against the update table 807 to obtain the record for this update, including the URL list 823 identifying the location of the relevant update files. This record is returned to the client computer 101. The client computer 101 accesses the identified URL(s) and downloads the software update files, typically from the software vendor computer 103, though downloads may be from mirror sites, or the like. The client computer 101 further downloads (from the received URLs) any additional installation files, such as installation executables, and scripts. The client computer 101 also verifies that the software update files are not corrupted.

In a preferred embodiment, the client computer 101 employs its security module 901 to verify the integrity of the files to make sure that they have not been corrupted.

The software update is then installed 212 by the client application 104 as described, using the format information 825 to determine the particular installation process, and the script 826 to control any custom installation or configuration information.

Installation 212 is monitored by the install monitor 910, which is executed prior to the actual installation. The install monitor 910 documents the state of the client computer 101 prior to installation and the changes made during the installation of a software update. The install monitor 910 operates in the background, and intercepts calls to the file system or other operating system calls that might result in changes to any files in the client computer 101. Depending on the specific call, the install monitor 910 takes action to preserve the state of the file before the change is made.

Figure 11:
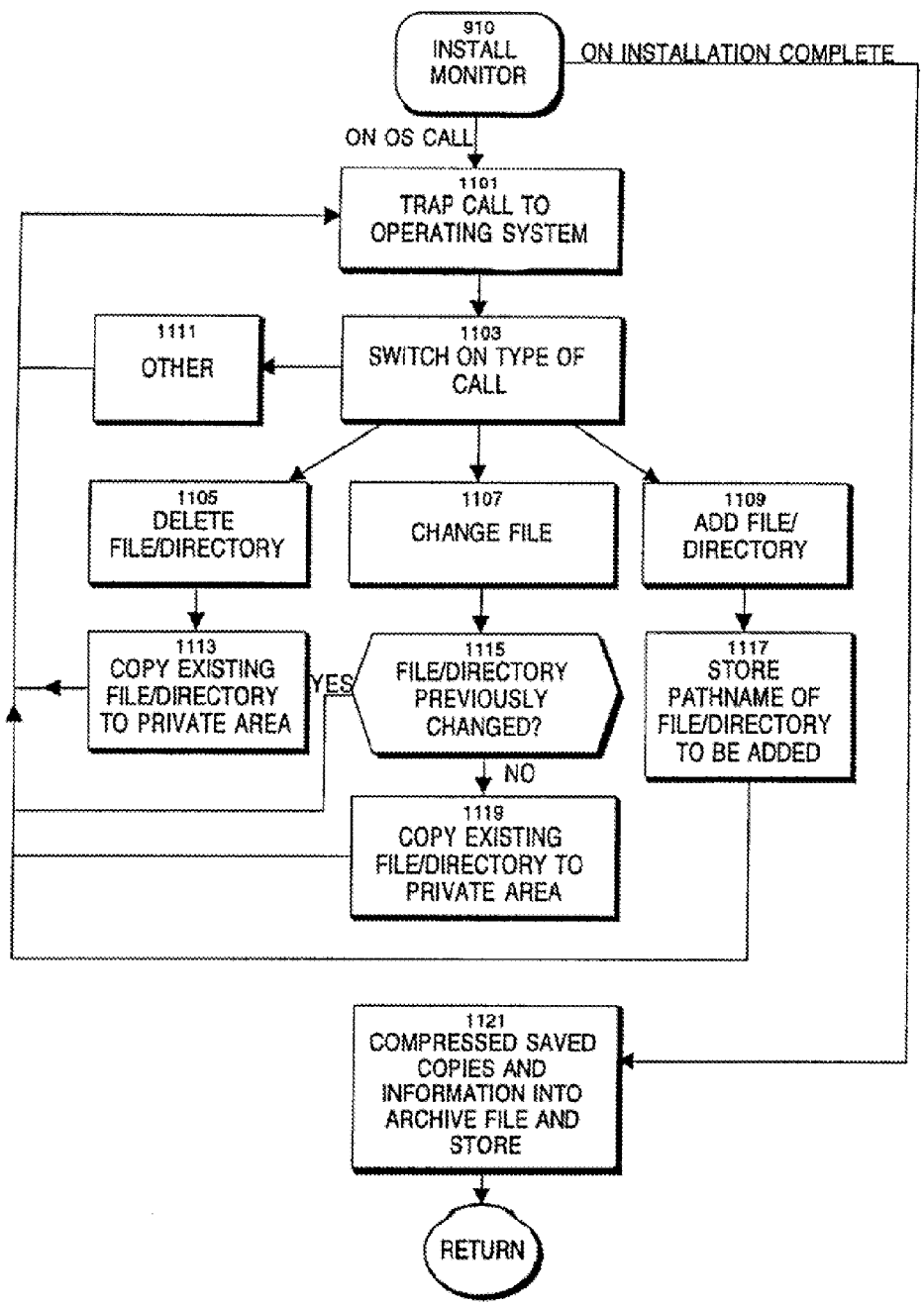
FIG. 11 is a flowchart of the operation of the install monitor.

FIG. 11 illustrates a flowchart of the operation of the install monitor 910. The install monitor 910 receives operating system calls and messages from the client application 104. On trapping 1101 an operating system call, the install monitor 910 determines 1103 the type of call. There are three types of calls of interest: calls 1105 that delete a file or directory, calls 1107 that change an existing file by writing to it, and calls 1109 to add new a file or directory. When a file or directory is to deleted, the install monitor 910 first makes 1113 a copy of the existing file or directory to a private area of the client computer's 101 hard disk or other storage device. The install monitor 910 then lets the operating system 917 delete the file or directory, and waits for the next call. When a file is to be changed 1107, the install monitor 910 determines 1115 whether this is the first write to the file. If so, then again, the install monitor 910 copies 1119 the file to the private area. If the file has been already changed during the installation, there is no need to copy it again. These copy to operations 1113, 1119 preserve the configuration of the client computer 101 prior to the installation. Finally, if a new file or directory is to be added 1109, the install monitor 910 stores 1117 the pathname of the new file or directory. This allows the new file or directory to be later deleted during an undo of the installation. For all other types 1111 of operating system calls, the install monitor 910 passes them through without action.

The install monitor 910 waits for installation process 212 to complete, preferably indicated by a message from the client application 104. At this point the complete prior configuration of the client computer 101 is known from the copied files and pathname information. These files and information are compressed 1121 into an archive file 909 and saved on the client computer 101, along with information identifying the software product installation to which it belongs. This identifying information allows the recovery module 908 to retrieve the archived information and restore the configuration of the client computer, 101.

Other Service Provider Software Architecture

Referring again to FIG. 7, the remaining modules of the service provider computer 102 are now explained.

Communication

The communications module 703 provides for the establishment, maintenance and termination of network connections between the service provider computer 102 and either the software vendor computers 103 or the client computers 101. The communications module 703 supports the FTP and HTTP protocols for sending and receiving data over the Internet and the World Wide Web. The communications module 703 generally maintains and establishes separate streams for each connection it maintains. Preferably, the service provider computer 102 supports a large number of connections, possibly several hundred or thousands, at a time. In the event the customer base is so large that an even larger number of simultaneous connections may be required, multiple servers with mirror images of the update database 709 may be used. The communications module 703 also handles login and logout in a conventional manner, though these functions may be incorporated into the security module 701, below.

Security

The security module 701 handles the authentication of the user as an authorized user of the service provider computer 102. The security module 701 may be implemented with conventional authentication mechanisms based on digital signatures, such as public key systems supporting digital signatures, certificates and the like. Suitable security mechanisms include VeriSign Digital ID Center, which incorporates the login and logout functions from the communications module 703.

Additionally, the security module 701 provides for verification of the integrity of software updates that are downloaded from software vendor computers 103 to ensure that such updates have not been altered or infected by computer viruses or other unauthorized modifications. This module may be used, for example, to compute a checksum of the updates and the checksum may be stored in the update database 709. The checksum may be a simple one, or a cryptographically secure one such as any of the Message Digest (MD) algorithms proposed by Professor Ronald Rivest and commonly available in programming API's such as Microsoft's Cryptographic API standard. Whenever an update is later downloaded to a client computer 101 from a software vendor computer 103, the checksum of the update may be computed and compared against the one stored in the update database 709. If the two match, it may reasonably be inferred that the software update was downloaded to the client computer 101 correctly. The security module 701 may also be used to scan for viruses in the software updates stored on the various software vendor computers 103.

Payment

The payment module 705 handles payment by the end user to the service provider for the service of providing software updates. The service provider computer 102 maintains a database of its users. This database may be the user profile database 711 or other databases. Each user is charged a service fee for using the service provider computer 102 to download software updates. The fee may be based on a variety of different schedules, such as connection time, number of software updates purchased, annual or monthly subscription fee, or a combination of any of these or other pricing formulas. However charged, the payment module 705 tracks the user's usage of the service, for example, total the connection time, and maintains a count of the number of software updates downloaded, until the user logs out of the service provider computer 102. Payment is then charged to the user's credit card, which was previously supplied by the user during registration. Suitable implementations of the payment module 705 may be created in conformance with the Secure Electronic Transaction specification of Mastercard and Visa.

A user's subscription to the service may be enforced by the payment module 705 in various ways. One example of an algorithm to enforce term subscription is as follows:

The user logs in from the client computer 101 to the service provider to computer 102. The payment module 705 determines if the user's account is current, and if so, accepts the connection to the client computer 101. If the user's account is about to expire, for example, within 30 days, or has expired, the payment module 705 prompts the user to renew the subscription. If the user agrees, the subscription fee is charged to the user's credit card account, and the connection to the client computer 101 is established, allowing the user to use the service as described. If the users refuses to renew, the connection is refused.

Fees may also be charged on a per-transaction basis. In this scenario, the fees may be attached to selected transactions. Once example of an algorithm to enforce per-transaction fees is as follows:

The client application 104 requests, for a software product to be updated, a transaction permission from the service provider computer 102. The payment module 705 determines from the update database 705 a specific fee for the transaction, and returns this information, along with a permission, to the client application 104. The client application 104 displays the fee to the user, who either confirms the transaction or cancels the software update. If the transaction is confirmed, the client application 104 performs the installation process. The payment module 705 is notified if the transaction and installation is successful, and then adds the transaction fee to a running total of fees for the current session. When the user's session is complete, the running total of transaction fees is charged to the user's credit card, and the charges provided to the client application 104 which displays them to the user.

In cases where an update is going to be undone by the recovery module 908, the transaction fees should to be credited back to the user's credit card account. Here, the client application 104 informs the service provider computer 102 that a software update is to be undone, providing the update ID 819 of the software update The payment module 705 uses the update ID 819 to determine the transaction fee (cost 824) to be credited. This amount is passed back to the client application 104 and displayed to the user. The software update is removed by the recovery module 908, and the payment module 705 is notified of the successful removal. The payment module 705 then subtracts the transaction fee from any current running total of fees. At the close of the session, the payment module 705 either charges or credits the user's credit card account, as appropriate.

Database Modification

The database modification tools 707 provide for the maintenance and updating of the update database 709 to include new software updates from various software vendors. The tools 707 provide for the addition of new entries, and the deletion or alternation of existing entries in any of the tables of the update database 709.

Of the various tables, the update table 807, which contains the information about the current updates for the software products, and the product table 805, which identifies the various software products for which their are updates, are the most frequently modified.

Figures 13, 13A, 13B, 13C, 13D, 13E:
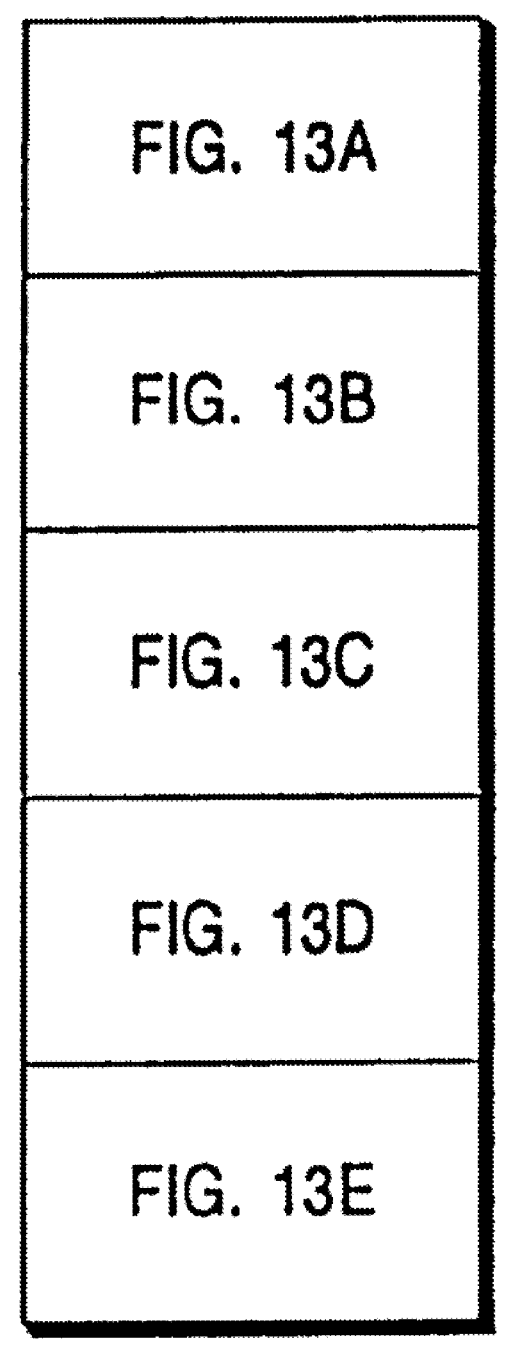

As new software updates become available, either the service provider or the software vendors access the database modification tools 707 to update the database. This is preferably done by completing forms that capture the information used in the tables of the database. FIG. 13 illustrates a sample form for specifying new update information, or changing existing update information. The form 1300 includes fields for providing the remark 1301 used in describing the update, a URL 1303 for the information on the software update, version information 1305, software products 1307 affected by the update, the type of update 1309, known incompatibilities 1311, filters for locating prior versions of the software product to be updated based on version information 1313, date information 1315, and Registry information 1317 (for identifying the software product in the Registry files of the 915 of the client computer 101). In addition, the file format 1321 of the update is specified along with a URL 1319 for the network location of software update itself. Finally, the installation procedures 1323 are specified for use in an installation script 826. This information readily processed in a conventional manner and updated to the appropriate tables of the update database 709.

In order to be supported by the update service of the service provider, software products and the updates to the software products have to be registered in the update database 709.

Figures 17, 17A, 17B, 17C, 17D:
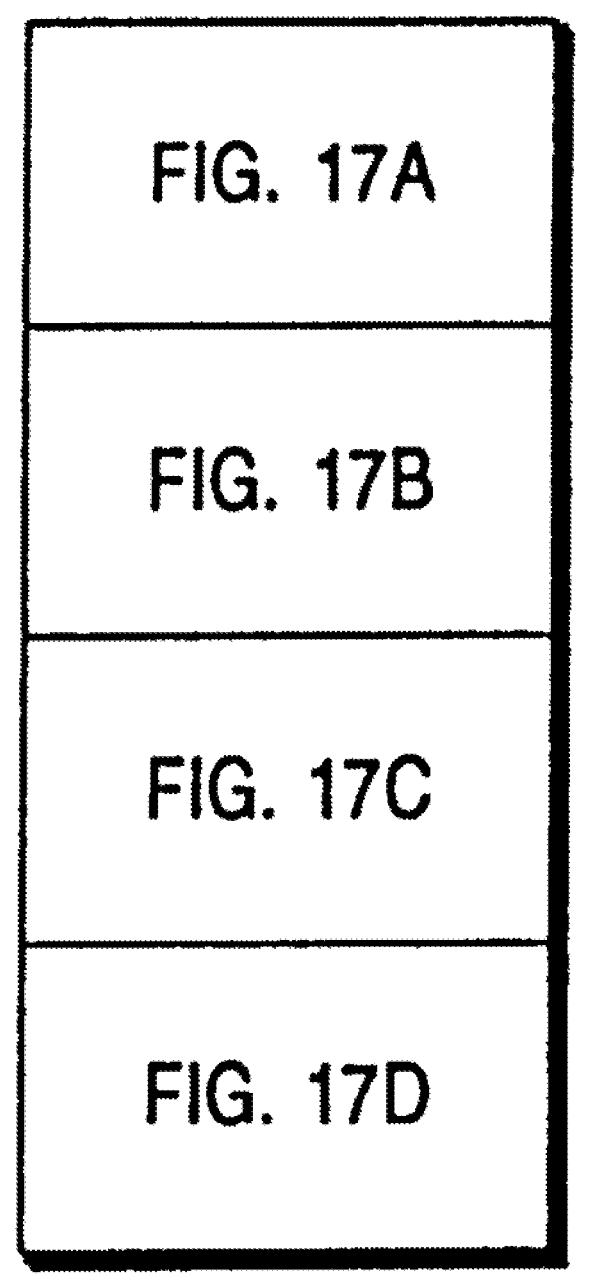

Registering a software product has the goal of specifying sufficient information to identify a product and its version if the product has been installed on a given client computer 101. FIG. 17 illustrates a form for registering a software product into the update database 709 for the first time. The registration form 1700 contains fields for the software vendor's company name 1701, software product name 1703, product type 1705, a method 1707 to identify the software product on the client computer 101, a unique file name 1707 or character string identifying the product, methods 1709 for verifying version information, file dates 1711, and directories 1713 on the client computer 101.

The product type 1705 can be a device driver, an application, a plug in (a product which extends the capabilities of another product such as an Internet browser) or an operating system file.

The method 1707 to identify the software product preferably specifies a unique file name or a character string and the location of the file name or string. For example, on the Windows 95 operating system, the name of a sound driver is specified in the Registry location \HKEY_LOCAL_MACHINE\System \CurrentControlSet\control\MediaResources\midi. In this case, the filename of the driver is found in this Registry location. A software product could also be identified by the presence of unique directory names. As noted, in some instances, product names are not unique.

The version of the software product that is installed on a client computer 101 may be obtained in one of several ways. It may be the version number, the last modification timestamp of a file, or it may be specified explicitly in the Registry. The information provided in the registration form is processed after submission and added to the appropriate tables of the update database 709.

Software updates may be identified for inclusion in the update database 709 by the service provider periodically searching the Internet to identify software vendors providing updates of software products. Most software vendors will maintain Internet sites that indicate the presence of new software updates. For each identified software vendor, the service provider downloads the software updates to the updates database 709. A file format of the software update is determined, and an installation process specified according to the file format of the software update. Finally, the service provider creates an entry in the update database 709 including the URL or network location of the software vendor's computer system 103 storing the software update, the file format of the software update, and a specification of the installation process.

Alternatively, software vendors who contract with the service provider may provide the information about their software products and software updates, e.g. name, file format, and so forth, directly to the service provider, or to the update database 709.

However provided to the update database 709, registering an update consists of specifying the properties of the software update and the software products and their versions to which the software update is applicable. The properties of the software update preferably include the new version number 820 that results if the software update is applied to the product, the format 825 of the software update—zip file, self-extracting archive, and the like, and the installation steps (script 826) required to install the software update on the client computer 101. The product versions to which the software update is applicable are specified as the products themselves are specified earlier in this section. Also, a URL to a brief description and a full description of the software update—the problems it fixes and features it might add—is preferably included, or the information may be directly stored.

As each new update becomes available, a new update entry is created.

Either the software vendor or the service provider specifies the product and the software update database entries in conformance with the properties of the software update.

User Profile Database

The user profile database 711 maintains a profile for each user containing information about which products the user has shown an interest, for example by requesting notification about software updates for specific products, or about new software products. This information is then used to deliver notifications about new updates available for these products to the icy user, for example by email, or other electronic communications mechanisms. This optional feature of the service provider computer 102 further enhances the value of the service to the user, ensuring timely notification of the availability of software updates and new software products.

In this regard, one alternate embodiment of the present invention is the use of email to notify users about new software update information, and new software products for which the user has expressed an interest. Specifically, when a new software update or software product is available, the service provider computer 102 sends an email to those users who have requested notification by email. The email contains information about the software update, and may include the record from the update table 807 about the software update, including the URL data 823 used to access the software update files. The client application 104 would then read the update information, and verify that the software update is indeed applicable to the client computer 101, and that the client computer 101 satisfies any conditions for installation. If the software updates are approved by the user, the client application 104 downloads the software update, verifies its integrity, and installs the software update directly, without having to login 201 to the service provider computer 102, and analyze 204 the software products installed on the client computer 101. In the case of notifications about new software products in which the user had expressed interest, the client application 104 would verify that the user is still interested in the software product and proceed to purchase, download and install it.

As a further enhancement of the e-mail notification embodiment, the email sent by the service provider computer 102 includes a specification of conditions a client computer 101 must satisfy for the software update or software product to be installed. This information is essentially the same as that used by the client application 104 to determine the relevant software updates for the client computer 101. For example, this information includes, for a software update, the older versions of the software product to which it is applicable. This additional information in the email notification is used by the client application 104, for example, to ensure that the software update is used only once by the user, and can be repeatedly applied.

Figure 14:
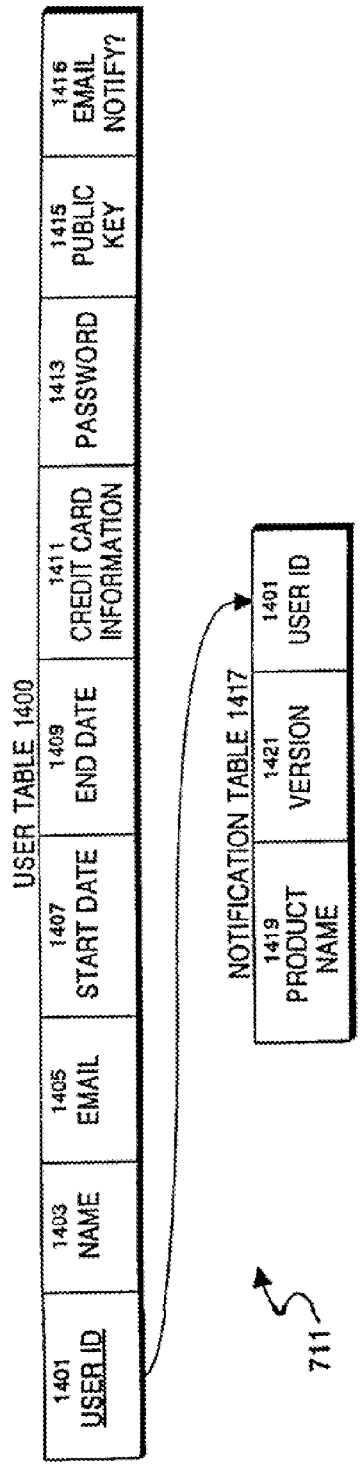
FIG. 14 is one embodiment of a schema for the user profile database.

The user profile database 711 generally stores information descriptive of each user. This information may include the user ID, password, digital signature, credit card numbers and the like, for use by the security 701, communications 703, and payment 705 modules. FIG. 14 specifies one exemplary schema of the user profile database 711. In a user table 1400, each user is identified by user ID 1401, name 1403, email address 1405, the start date 1407 of their subscription to the service, the end or termination date 1409 of the subscription, credit card information 1411 such as number, issuer and expiration date, a user selected password 1413, and a public key 1415 or other authentication token. As illustrated in FIG. 3, the user has the option 309 of requesting notification by email of such software updates. The user table 1400 thus also includes a flag 1416 indicating whether the user so desires to be notified by email. The user table 1400 is keyed by the user ID 1401 to a notification table 1417 that associates the user with selected product names 1419 and their current version 1421. When a software vendor or the service provider updates the update database 709 with information for a new software update, the notification table 1417 may be scanned to identify those users by user ID 1401 to notify about the update. The email flag 1416 for a user is checked, and if true, the user's email address 1405 is obtained from the user table 1400 and the user notified by email with information identifying the new software update.

Activity Log

The service provider computer 102 may be used to log all activities it performs with respect to the service in the activity log 718. Of particular interest are the activities the computer performs in response to user requests for software updates and the like. An illustrative format for the activity log 718 is shown in Table 2.

TABLE 2

Activity Log 718

| Transaction Id | Activity Type | Date-Time | User Id | Parameters | Response |
|---|---|---|---|---|---|
| 00000001 | Login | 031296 093540 | 20198312 | password | Success |
| 00000002 | GetMethods DB | 031296 093606 | 20198312 | last version | Methods DB or Up-to-date |
| 00000003 | GetProducts Locator DB | 031296 093649 | 20198312 | last version | Products-Locator DB or Up-to-date |
| 00000004 | Query Product DB | 031296 093723 | 20198312 | Sound Blaster16, | sb-2.02 |

TABLE 2-continued

Activity Log 718

| Transaction Id | Activity Type | Date-Time | User Id | Parameters | Response |
|---|---|---|---|---|---|
| | Query Product DB | 031296 093727 | 20198312 | 2.0 Myst 1.0 | Up-to-date |
| 00000005 | GetUpdate Entry | 031296 093751 | 20198312 | sb16-2.02 | Update Entry |
| 00000006 | Download Done | 031296 093807 | 20198312 | sb16-2.02 | Success |
| 00000007 | Installed Update | 031296 094532 | 20198312 | sb16-2.02 | Success |
| 00000008 | Logout | 031296 094730 | 20198312 | — | Success |

In this example, the user logged in on Mar. 12, 1996 at 09:35:40 a.m., synchronized their method table 801 and product locator table 803, queried if software updates for SoundBlaster16 2.0 and Myst 1.0 newer than these product's last version were available. The responses indicate that Myst 1.0 was update to date, but the current version of SoundBlaster16 was version 2.02. The user then obtained the update entry for the new version of SoundBlaster16 describing the software update, downloaded the software update, installed it, and logged out.

Activity types not represented in the example above include Undo of Updates by the recovery module 908, registering for service, and registering for notification for updates to specific products.

In this example, the activities of a single user are represented in the activity log. In an actual system, the activities of several different users would be interspersed in the activity log.

Reporting Tools

The reporting tools 713 provide support for querying the update database 709, the user profile database 711 and the activity log 718. The queries may be about the software products and updates, about the correlation between the types of software updates accessed by various users, and about aggregate data. The databases 709, 711 and the activity log 718 together have the potential to provide precise descriptions of the software product profiles of the users. For example, statistical information may be retrieved indicating the number of users of one product, such as SoundBlaster16, who also own a second product, such as Myst. This information may be collected and analyzed without necessarily violating the privacy of the individual users.

URL Monitor

Figure 12:
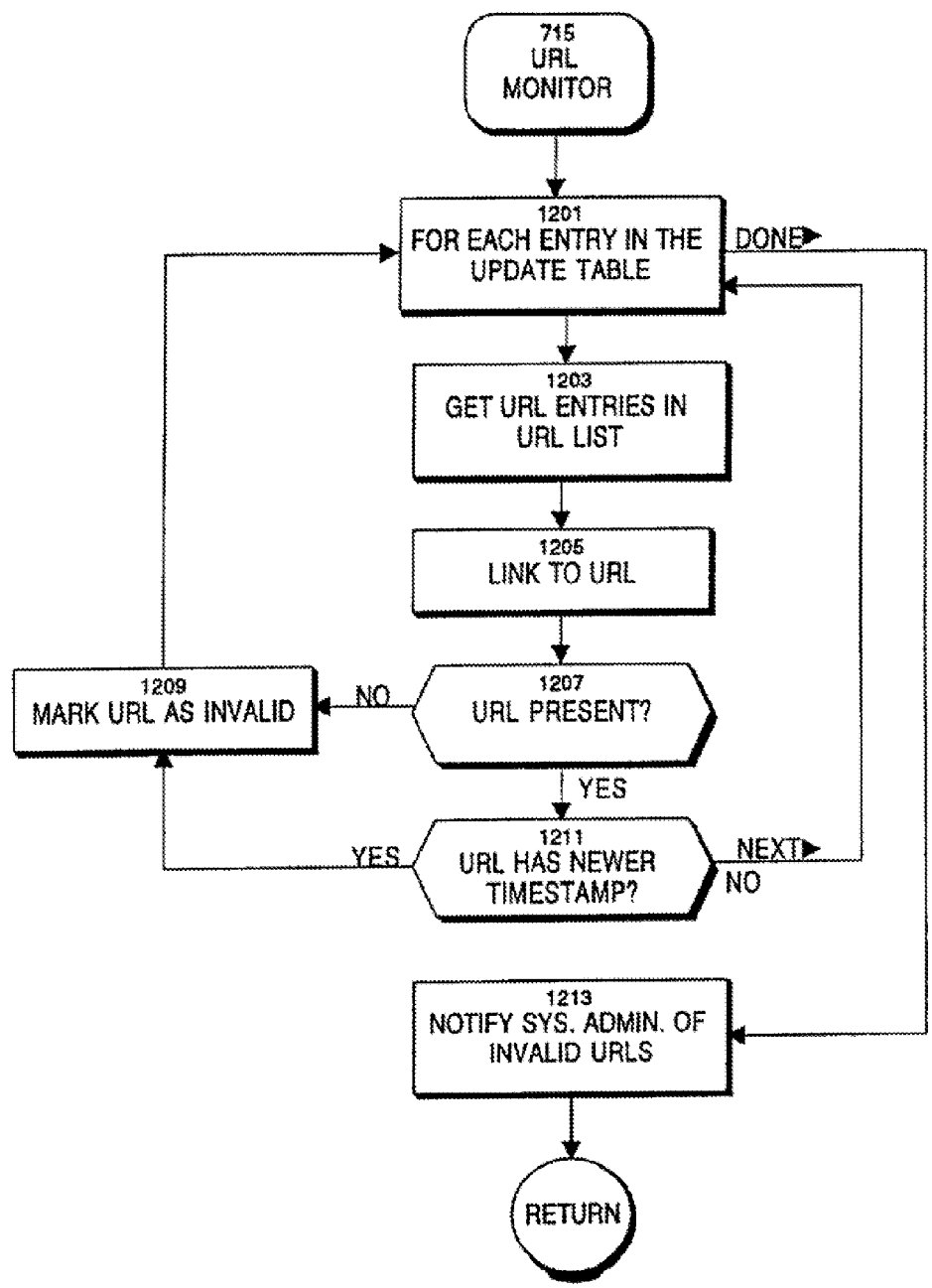
FIG. 12 is a flowchart of the operation of the URL monitor.

The URL monitor 715 compiles the list of URLs in the update database 709 and verifies on a periodic basis whether they have changed. This is done to ensure that the URL information for the software updates is always valid. FIG. 12 illustrates a flowchart of the URL monitor 715. The URL monitor 715 traverses 1201 each entry in the update table 807. This may be done simply in serial order, or by more complex approaches, such as oldest entries first, or soiree other fashion. For each entry, the URL monitor 715 obtains 1203 the URL entries in the URL list 823, each entry as noted above having a timestamp. The URL monitor 715 links 1205 to the URL in an attempt to connect to the identified site or file via the Internet.

The attempted link may fail, and may be repeated some number of times in order to confirm that the URL is actually absent or otherwise incorrect, as opposed to merely a failure of the network service provider or the like. Once it is determined 1207 that the URL is not present, the URL is marked 1209 in the update table 807 as being invalid.

If the URL is present, then the timestamp of the URL at the host site is checked, typically by checking the timestamp of the file associated with the URL, or the timestamp of the file that includes the URL, or whichever is later. If the timestamp at the host is newer than the timestamp held in the update table 807, then it is possible that the underlying file has been changed, and the URL is no longer valid. Again, the URL is marked 1209 as being invalid. If the timestamp of the host is not newer, then the URL monitor 715 continues with the next URL in the URL list 823. Once all of the URLs in the update table 807 (or the desired number of old ones) have been processed, then the URL monitor 715 notifies 1213 the system administrator of the potentially invalid URLs. The system administrator can then verify the URLs and update them if necessary, resetting the valid flag as the URLs are updated.

Advertising & Information Database

The access that the service provider computer 102 has to the software profile of the client computers 101 lends itself to sending information, advertisements, and other promotional material that would be appropriate to each specific user, based on the software installed on the user's computer. Basing information delivery on the installed software products increases the saliency of the information since the user has already manifested an interest in the products. Thus, advertising or promotional information that is derived from or associated with such software products is most likely to be of interest to the user. The service provider computer 102 associates software products with advertising information, and enables this advertising information to be periodically delivered to the user.

Furthermore, the nature of downloading and installing software updates is inherently time-consuming; the risks that users perceive in updating usually would mean that they would seldom perform the updates on unattended computers. These factors create an opportunity to the service provider to direct targeted advertisements at the user at appropriate moments when the user runs the client application 104 to update their software, at which time they are present at their computer but not engaged in other activities. The advertisements themselves may be about for-fee software updates (upgrades) that the user may be able to purchase from the service provider or other third parties. Delivery of advertising information during the update process 212 is on the client computer 101 by the advertising/news module 906.

Figure 15:
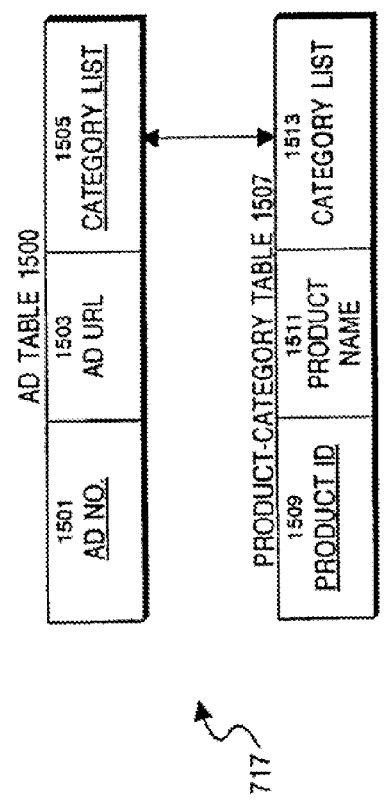
FIG. 15 is one embodiment of a schema for the advertising information database.

The advertising and information database 717 accordingly associates software products with advertising and promotional information. This association may be made in a number of different ways. One mechanism of association is categorizing software products and advertisements. FIG. 15 illustrates an exemplary schema for the advertising and information database 717 for associating advertising information and software products.

The ad table 1500 includes for each advertisement an ad number 1501, a URL 1503 to the advertisement or information item, and a list 1505 of categories for the advertisement, such as "word processing," "desktop publishing," "graphics," "adventure games," "communications," "Internet" and the like. An advertisement or information item may have any number or variety of categories associated with it. The product-category table 1507 lists products names 1511, product IDs 1509, and again, a list 1513 of categories for the product.

If a user has requested updates to a specific installed product, then presumably the user would be interested in advertisements or informa tion for other products that are categorized in the same categories as the installed product. For example, if the user requests an update to an installed copy of Myst 1.0, then this product name is matched against the product name 1511 in the product-category table 1507, and the categories 1513 for it, such as "interactive game," are retrieved. The categories 1505 in the category list 1505 of the ad table 1500 are matched against this category, and the URLs 1503 for matching entries retrieved and accessed, with the information being delivered to the user by the client application 104. The information is preferably presented on the client computer 101 during the installation process 208-214. If there are many matches, then a weighting may be applied to select only those advertisements that match a certain percentage, or number, of categories of the installed products. Other selection criteria may also be applied. The schema of FIG. 15 is merely illustrative, and implementations other categorization may be used to associate advertising information with software products for delivery to users having such products installed on their computers.

Client Application Software Architecture

Referring again to FIG. 9, the remaining modules of the client application 104 are now explained.

Communication

The communications module 903 provides complementary functions to the communications module 703 of the service provider computer 102, including establishing and terminating connection streams, login and logout functions, FTP functions, and HTTP protocol compliance. All of these functions may implemented in a conventional manner.

Security

The security module 901 provides an interface to the security module 701 of the service provider computer 102, for authentication of the user password, digital signatures, certificates, or the like. User passwords or other authentication information are assigned to the user in a conventional manner. The security module 901 may store the authentication information, or the user may be required to manually input the authentication information during login.

Payment

The payment module 905 provides an interface to the payment module 705 of the Service provider computer 102 to effect payment for use of the update service. Payment schedules may vary as described above. Preferably payment is made by credit card authorization. Given one or more payment schedules for use of the service, such as per update, periodic fees, or the like, the payment module may be implemented in a conventional manner.

Registration

The registration module 904 is used to register new users to the service provider computer 102. A sample user interface for the registration module 904 is shown in FIG. 3.

The registration module 904 obtained the user's name, address, credit card information, and a user-selected password. The password is entered by the user twice and the two entries matched to ensure that the user did not mistype the password unintentionally. This information is stored in the current state 911 data. The registration module 904 also sends this information to the service provider computer 102. There the information is verified and a unique registration number assigned to the user and the number is returned to the client application 104, where the registration module 904 displays the number to the user, and stores the number internally in the current state 911 data.

Advertising & News

The advertising and news module 906 provides customized information to each user of the service based on their prior interests in various software products and updates, as monitored and stored in the user profile database. The advertising and news module 906 interfaces with the advertising database 717 of the service provider computer 102 to deliver advertising and promotional information the user based on the installed software products on the user's computer 101. The advertising and news module 906 provides information in various different modes. In one mode, the advertising and news module 906 obtains ads from the advertising database 717 on a periodic basis, such as once every several hours, according to the installed software products on the client computer 101, as described above, and caches them locally. If an ad (here including other types of information or promotional data) is already present in the cache, it is marked as new, otherwise, the URL of the ad (as determined from the database 717) is accessed, and the ad saved in the cached. Ads not marked as new are purged.

In a second, complementary mode, the advertising and news module 906 then selects ads from the cache and displays them to the user for a predetermined duration when no other user activity is occurring, such as during the installation process described above, or during an undo operation by the recovery module 908.

Current State

The current state 911 is a data store of data describing the present operation of the client application 104, including for example, user specific information, such as name, address, credit card number, registration or serial number, and which updates have been downloaded and which have been installed. The registration number is used each time the user logs in to the service provider computer 101. The information about which updates have been downloaded and installed is used to provide the undo capability of the recovery module 908.

Recovery

The recovery module 908 provides for undoing, or de-installing previously installed software updates using the archive files 909.

Recovery is an action initiated by the user when he or she is dissatisfied with a software update. When initiated, the effects of a software update previously installed are reversed. The ability of the recovery module 908 to perform the recovery is based on the presence of the archive files 909 created by the install monitor 910 when the software update was first installed. The archive files 909 contain a copy of each file which was deleted or modified during installation along with its original pathname and a list of pathnames of files added during the installation. The archives 909 are preferably kept in a compressed format for space efficiency. Generally, given a specific software update to remove, the recovery module 908 reads the archive file 909 associated with that software update, restores the deleted or modified files to their directories, and deletes the added files or directories.

Figure 16:
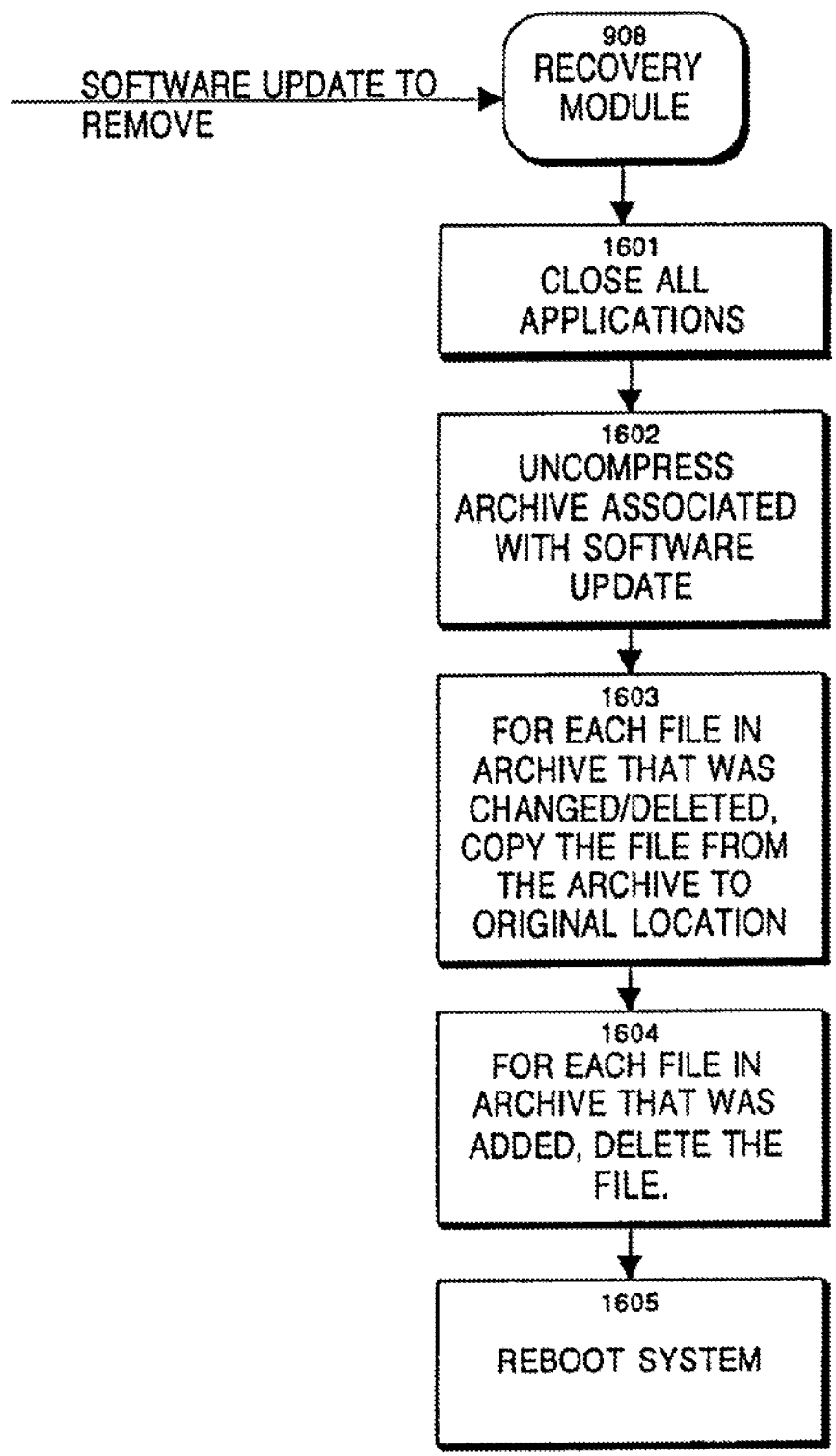
FIG. 16 is a flowchart of the operation of the recovery module.

FIG. 16 illustrates one embodiment of the operation of the recovery module 908: The recovery module 908 receives, as shown in FIG. 6, an input of the name of the software update to be removed. This name is associated in the current state information 911 with the particular archive file 909 for that installation. The recovery module 908 closes 1601 all executing applications. Using the name of the software update, or other identifying indicia, the recovery module 908 obtains the archive file 909 associated with the update, and uncompresses 1602 it. For each file that is stored in the archive in compressed form, representing a file that the was deleted, the recovery module 908 copies 1603 that file to its original location in the client computer 101. For each file or directory that is listed as being new, the recovery module 908 deletes 1604 that file or directory. Finally, the recovery module 908 reboots 1605 the client computer 101.

In summary, the present invention enables a useful mechanism for providing updates of various software products from diverse software vendors to a plurality of users, each user having different ones of the software products installed on their computers. The system of the present invention enables the software updates to be continually maintained and verified for correctness, while alleviating both users and software vendors of a substantial burden is communicating with each. The system enables any software vendor to provide software updates to the service provider, ensuring that subscribing users have the software update on a timely basis. Likewise, subscribing users are ensured that they are notified about software updates for all of the software products installed on their computers, without having to individually search out information for each such product. In addition, the present invention enables advertising and other information to be targeted to users based on their interests and preferences and expressed in the software products installed on their computers.

The invention claimed is:

1. A computer-implemented method, comprising:
    installing a software update client application on a client computer, wherein the software update client application is capable of facilitating the installation and uninstallation of one or more updates of diverse software products;
    creating an electronic message that identifies one or more diverse software products for which an update notification is desired;
    conveying the electronic message to a service provider computer over a network;
    installing a software update on the client computer, the software update associated with the electronic message;
    receiving a first user instruction to uninstall the software update from the client computer;
    said first user instruction being received via an interface; and
    uninstalling the software update from the client computer, in response to the receipt of the first user instruction.

2. The method according to claim 1, wherein the computer is restored to a state prior to the installation of the software update.

3. The method according to claim 1, and further comprising storing a configuration of the computer before the step of installing a software update.

4. The method according to claim 1, wherein the interface includes a field for indicating the software update.

5. The method according to claim 1, wherein the interface includes a window for describing the software update.

6. The method according to claim 1, wherein the interface includes a cancel option for canceling the uninstall operation.

7. A non-transitory computer program storage device having stored thereon computer usable program code to cause a client computer to:
    install an update client application, the update client application capable of facilitating the installation and uninstallation of one or more updates of diverse client applications;
    identify one or more diverse client applications for which an update notification is desired;
    create an electronic message identifying the one or more diverse client applications and a user;
    send the message to a service provider computer over a network;
    install an update on the client computer, the update associated with the electronic message;
    receive a first user instruction to uninstall the update from the client computer, the first user instruction received via an interface; and
    uninstall the update from the client computer, in response to the receipt of the first user instruction.

8. The non-transitory computer program storage device of claim 7, wherein the diverse client applications comprise client applications from diverse vendors.

9. The non-transitory computer program storage device of claim 7, wherein the service provider computer maintains information from diverse vendors to facilitate updating the diverse client applications from diverse vendors.

10. The non-transitory computer program storage device of claim 7, further comprising computer usable program code to cancel uninstall activity in response to a cancel request from a user.

11. The non-transitory computer program storage device of claim 7, wherein the computer usable program code to identify the one or more diverse client applications includes computer code to:
    install a software update client application on the client computer;
    use the software update client application to register a user of the update client application with the service provider computer.

12. The non-transitory computer program storage device of claim 7, further computer usable program code to:
    receive, over a network, a client software update notification message from a computer identifying at least one client software application update;
    identify, from the client software update notification message, a source computer from which to obtain the at least one client software application update;
    establish communication with the source computer over the network; and
    download the client software application update from the source computer over the network.

13. The non-transitory computer program storage device of claim 12, wherein the source computer comprises a computer other than the service provider computer.

14. The non-transitory computer program storage device of claim 12, further comprising computer usable program code to:
    verify that the client computer meets installation requirements identified in the client software update notification message; and
    install the downloaded client software application update on the client computer.

15. The non-transitory computer program storage device of claim 7, further comprising computer usable program code to:
receive, over a network, a client software update notification message from a service provider computer indicating the availability of a client software update; and
provide a notice to a user of the client software update availability, wherein the notice is visible.

16. A non-transitory computer program storage device having stored thereon computer usable program code:
the computer usable program code to cause a service provider computer to:
acquire information about one or more software updates for one or more client applications from diverse vendors;
identify a user that has indicated interest in the one or more client applications;
obtain an email address for the user;
generate a message identifying the one or more client applications; and
send the message to the user over a network; and
the computer usable program code to cause a client computer to:
install an update client application, the update client application capable of facilitating the installation and uninstallation of the one or more software updates of client applications;
install the one or more software updates by the update client application on the client computer, the one or more software updates associated with the message;
receive a first user instruction to uninstall the one or more software updates by the update client application from the client computer, the first user instruction received via an interface; and
uninstall the one or more software updates by the update client application from the client computer, in response to the receipt of the first user instruction.

17. The non-transitory computer program storage device of claim 16, wherein the computer usable program code to generate a message further comprises computer code to include one or more requirements for use of the one or more software updates in the message.

18. The non-transitory computer program storage device of claim 17, wherein the one or more requirements include one or more conditions a client computer must satisfy to install the one or more software updates.

19. The non-transitory computer program storage device of claim 16, wherein the message identifying the application includes a source for the one or more software updates . . . one more software updates comprises a source computer of a vendor of the diverse vendors.

20. The non-transitory computer program storage device of claim 16, wherein the computer usable program code to acquire information comprises computer usable program code to acquire information about a software update from a vendor of the software update.

21. The non-transitory computer program storage device of claim 16, wherein the computer code to identify a user comprises computer usable program code to search a user profile database.

22. The non-transitory computer program storage device of claim 16, wherein the computer code to send the message comprises computer usable program code to send an email message.

* * * * *

UNITED STATES PATENT AND TRADEMARK OFFICE
CERTIFICATE OF CORRECTION

PATENT NO. : 8,527,977 B1  
APPLICATION NO. : 11/855985  
DATED : September 3, 2013  
INVENTOR(S) : William Cheng et al.

Page 1 of 1

It is certified that error appears in the above-identified patent and that said Letters Patent is hereby corrected as shown below:

In the Claims:

In column 26, lines 14-18, in claim 19,
delete "The non-transitory computer program storage device of claim 16, wherein the message identifying the application includes a source for the one or more software updates . . . one more software updates comprises a source computer of a vendor of the diverse vendors." and insert -- The non-transitory computer program storage device of claim 16, wherein the message identifying the application includes a source for the software update; and wherein the source for the software update comprises a source computer of a vendor of the diverse vendors. --, therefor.

Signed and Sealed this
Twenty-sixth Day of November, 2013

Margaret A. Focarino
*Commissioner for Patents of the United States Patent and Trademark Office*